(12) United States Patent
Yamaguchi et al.

(10) Patent No.: US 10,982,106 B2
(45) Date of Patent: Apr. 20, 2021

(54) INFORMATION PROCESSING DEVICE, INFORMATION PROCESSING METHOD, AND STORAGE MEDIUM

(71) Applicant: CANON KABUSHIKI KAISHA, Tokyo (JP)

(72) Inventors: Hiromitsu Yamaguchi, Yokohama (JP); Fumitaka Goto, Tokyo (JP); Yuto Kajiwara, Kawasaki (JP); Yoshinori Mizoguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/691,470

(22) Filed: Nov. 21, 2019

(65) Prior Publication Data
US 2020/0172749 A1    Jun. 4, 2020

(30) Foreign Application Priority Data
Nov. 29, 2018    (JP) .............................. JP2018-224160

(51) Int. Cl.
| | | |
|---|---|---|
| *B41J 2/21* | (2006.01) | |
| *C09D 11/322* | (2014.01) | |
| *C09D 11/40* | (2014.01) | |
| *C09D 11/36* | (2014.01) | |
| *B41M 5/52* | (2006.01) | |
| *B41J 11/00* | (2006.01) | |
| *C09D 11/328* | (2014.01) | |
| *B41J 3/46* | (2006.01) | |

(52) U.S. Cl.
CPC .......... *C09D 11/322* (2013.01); *B41J 2/2107* (2013.01); *B41J 3/46* (2013.01); *B41J 11/002* (2013.01); *B41J 11/009* (2013.01); *B41M 5/5218* (2013.01); *B41M 5/5254* (2013.01); *C09D 11/328* (2013.01); *C09D 11/36* (2013.01); *C09D 11/40* (2013.01)

(58) Field of Classification Search
CPC ....... C09D 11/322; C09D 11/40; C09D 11/36; C09D 11/328; B41M 5/5254; B41M 5/5218; B41J 2/2107; B41J 11/002; B41J 11/009; B41J 3/46
See application file for complete search history.

(56) References Cited

FOREIGN PATENT DOCUMENTS

| | | | | |
|---|---|---|---|---|
| JP | 2009-192752 A | | 8/2009 | |
| JP | 2009192752 A | * | 8/2009 | ............... G09G 5/06 |
| JP | 2013-9063 A | | 1/2013 | |
| JP | 2013009063 A | * | 1/2013 | ............... H04N 1/46 |

\* cited by examiner

*Primary Examiner* — Yaovi M Ameh
(74) *Attorney, Agent, or Firm* — Canon U.S.A., Inc. IP Division

(57) ABSTRACT

An information processing device acquires information relating to a type of recording medium and outputs, on the basis of the acquired information, an instruction to display items for setting a color of a color metallic portion having color metallic luster, for recording an image by using a metallic ink.

24 Claims, 20 Drawing Sheets

FIG. 13
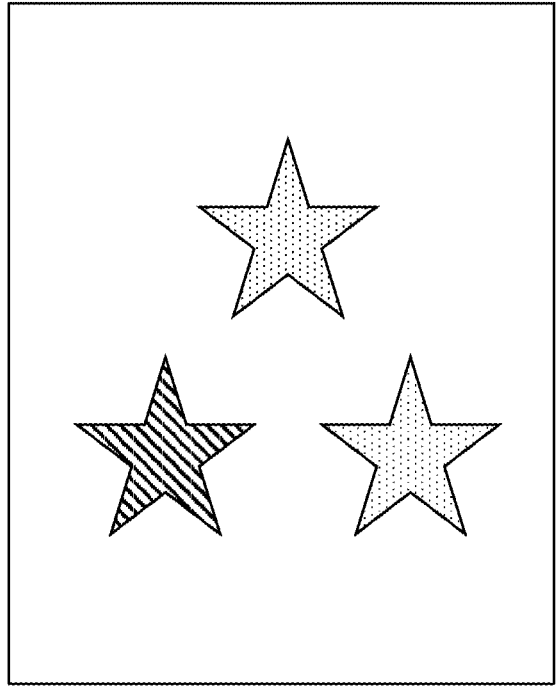
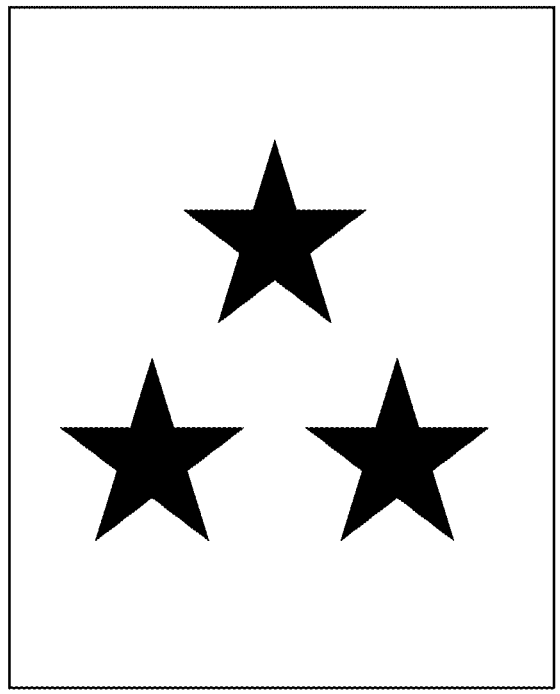
COLOR IMAGE DATA    METALLIC IMAGE DATA

INFORMATION PROCESSING DEVICE, INFORMATION PROCESSING METHOD, AND STORAGE MEDIUM

BACKGROUND OF THE INVENTION

Field of the Invention

The present disclosure relates to an information processing device, an information processing method, and a storage medium for recording color metallic recorded matter using a metallic ink having a function of exhibiting metallic luster.

Description of the Related Art

An example of a known ink containing metal particles is a metallic ink that can be applied to a recording medium with an ink jet recording device or the like. The use of such a metallic ink enables recorded matter having metallic luster to be generated. There is also known a recording device capable of generating recorded matter having color metallic luster by using such a metallic ink in combination with a chromatic color ink containing a color material.

Such a color metallic image is formed by providing a colored layer with a color material on an achromatic metallic luster layer using metal particles. In this case, light that is emitted from a light source and that enters the colored layer is reflected at the metallic luster layer, and the light that passes through the colored layer again is recognized as a metallic color. The color metallic performance in this color metallic image is determined by a high reflection intensity of light reflected from the metallic luster layer and a strong tint of the colored layer in the light having passed through the colored layer. Accordingly, in the case where light specularly reflected by an image has a high intensity and a tint, the image is recognized as a good color metallic image.

Applications for recording such color metallic images using metallic inks have been developed. Japanese Patent Laid-Open No. 2013-9063 discloses that in the case where a printed color appearing on printed matter printed with a printing device by using a metallic ink is observed under a plurality of observation conditions, an appearance under each condition is output as information based on color information.

A known image processing method uses a color palette as a method for displaying a color image. Japanese Patent Laid-Open No. 2009-192752 discloses that a plurality of color palettes are held and one color palette is selected in accordance with the number of colors included in image data input from a palette selection unit.

SUMMARY OF THE INVENTION

The present disclosure reduces a processing load of a user in processing image data for recording a color metallic image.

The present disclosure provides an information processing device relating to a recording device that records an image on a recording medium, wherein the recording device is capable of forming a color metallic portion by applying a metallic ink containing metal particles and a color ink containing a color material to a recording medium one over the other, wherein a first color difference between a color of a first metallic portion where only a metallic ink is applied to a first recording medium and a color of a first color metallic portion where the metallic ink and a first color ink are applied to the first recording medium one over the other is equal to or smaller than a predetermined threshold value, and wherein a second color difference between a color of a second metallic portion where only the metallic ink is applied to a second recording medium and a color of a second color metallic portion where the metallic ink and the first color ink are applied to the second recording medium one over the other is larger than the predetermined threshold value, the information processing device comprising: an acquisition unit configured to acquire medium information relating to a type of recording medium on which the image is to be recorded; and an output unit configured to output, on the basis of the acquired medium information, an instruction to cause a display unit to display a plurality of items corresponding to a plurality of colors for setting a color of a color metallic portion to be formed on the image, wherein an instruction that is output in a case where the medium information indicates the first recording medium includes an instruction not to display an item corresponding to a first color recorded by using the first color ink, and an instruction that is output in a case where the medium information indicates the second recording medium includes an instruction to display the item corresponding to the first color.

Further features of the present disclosure will become apparent from the following description of exemplary embodiments with reference to the attached drawings.

BRIEF DESCRIPTION OF THE DRAWINGS

FIG. 13 includes diagrams illustrating image data subjected to image editing.

DESCRIPTION OF THE EMBODIMENTS

Hereafter, an embodiment of the present disclosure will be described with reference to the drawings.

In the present embodiment, a description will be made of an information processing device using an application that has an image display function for editing image data in order to record, by using a metallic ink, an image that includes a color metallic portion having color metallic luster.

Description of Recording Device

Figure 1:
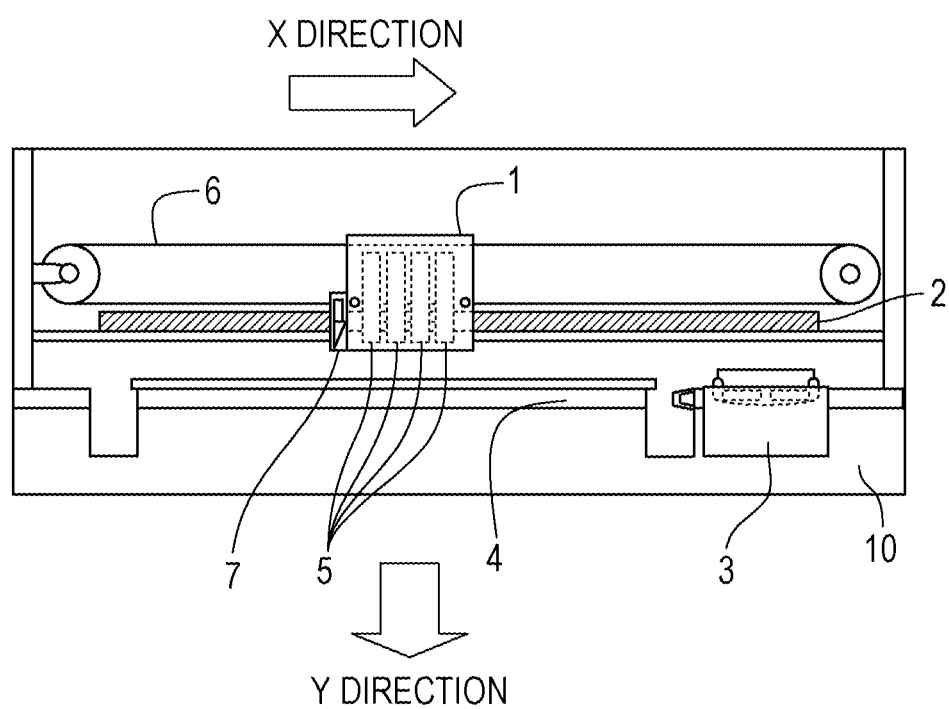
FIG. 1 is a view illustrating the configuration of an ink jet recording device.

FIG. 1 is a view illustrating the configuration of an ink jet recording device 10 (hereinafter, also simply referred to as a recording device) applicable to the present embodiment. A carriage 1 on which a recording head 5 including four nozzle rows and an optical sensor 7 are mounted reciprocates in an X direction in the figure due to transmission of a driving force of a carriage motor through a belt 6. In a relative movement between the carriage 1 and a recording medium 2, an ink is ejected from the recording head 5 to record an image on the recording medium 2 supported on a platen 4. After recording scanning is completed once, the recording medium 2 is conveyed by a distance corresponding to a recording width of one scan in a Y direction intersecting the X direction in the figure. The recording scanning and the conveying operation are alternately repeated a plurality of times to thereby record an image on the recording medium 2.

The optical sensor 7 performs a detection operation while moving together with the carriage 1, and whether or not the recording medium 2 is present on the platen 4 is determined. A recovery unit 3 configured to perform a maintenance process of the recording head 5 is disposed at a position apart from the platen 4, the position being located in a region that can be scanned by the carriage 1.

Description of Controller

Figure 2:
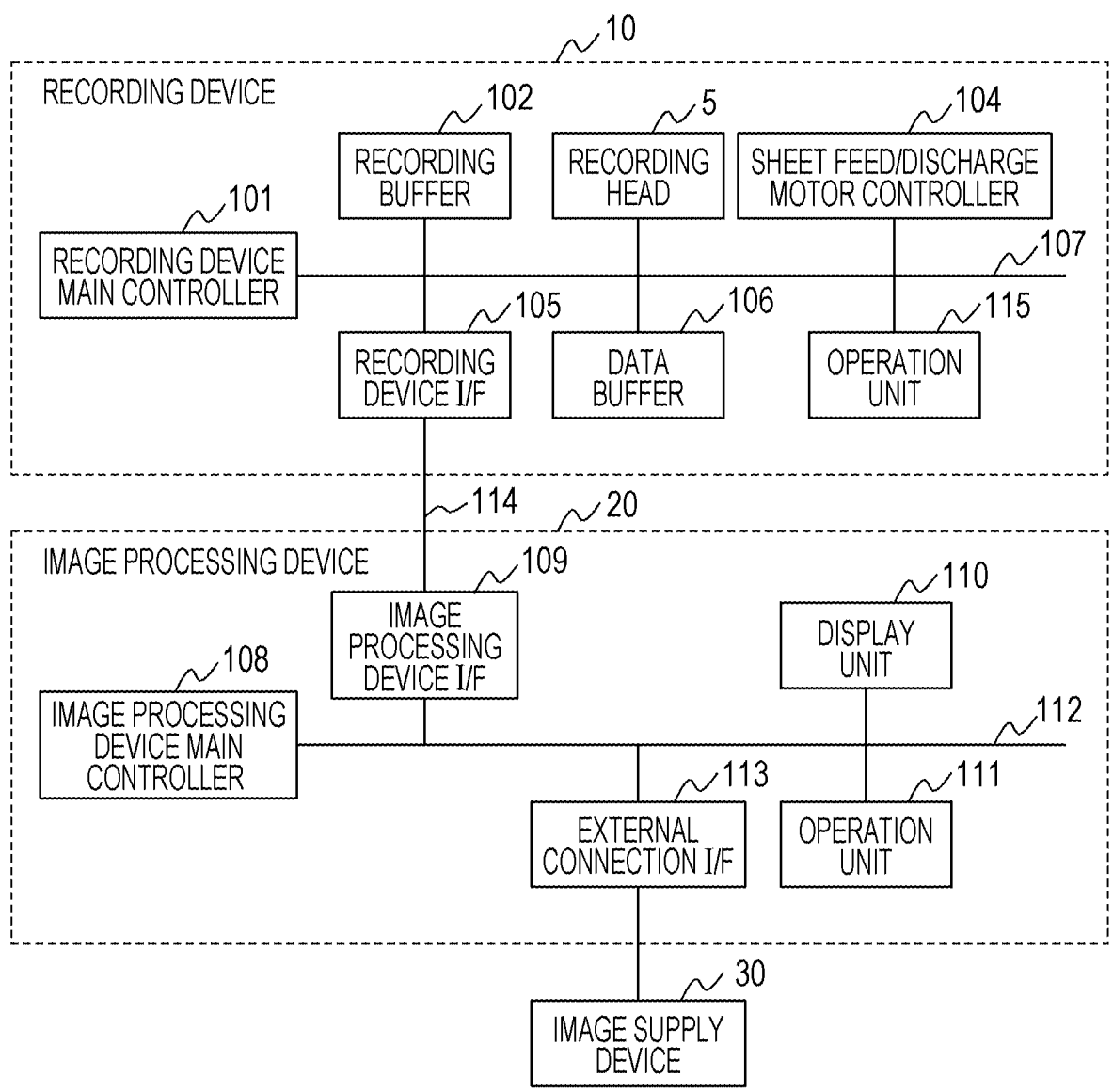
FIG. 2 is a block diagram illustrating a control configuration.

FIG. 2 is a block diagram illustrating a control configuration of an ink jet recording system of the present embodiment. The ink jet recording system of the present embodiment is constituted by an image supply device 30, an image processing device 20, and an ink jet recording device 10.

Image data supplied from the image supply device 30 is subjected to predetermined image processing in the image processing device 20, subsequently sent to the ink jet recording device 10, and recorded by using inks. In the ink jet recording device 10, a recording device main controller 101 is constituted by a CPU, a ROM, a RAM, and the like and controls the entirety of the ink jet recording device 10. A flowchart in FIG. 7 described later is executed by the CPU of the recording device main controller 101. A recording buffer 102 stores image data before being transferred to the recording head 5 as raster data. The recording head 5 is an ink jet-type recording head having a plurality of recording nozzles capable of ejecting inks as droplets, and ink droplets are ejected from each of the recording nozzles in accordance with image data stored in the recording buffer 102. The recording head 5 of the present embodiment has four recording nozzle rows corresponding to three color inks of a cyan ink containing a cyan color material, a magenta ink containing a magenta color material, and a yellow ink containing a yellow color material and a metallic ink containing metal particles. Each processing unit is connected to the recording device main controller 101 via a data bus 107. A sheet feed/discharge motor controller 104 controls a sheet feed motor and a sheet discharge motor. A recording device interface (I/F) unit 105 is connected to an image processing device interface (I/F) unit 109 via a cable 114 such as a LAN or USB cable. An operation unit 115 is, for example, a touch panel and receives an input from a user.

Description of Recording Head

Figure 3:
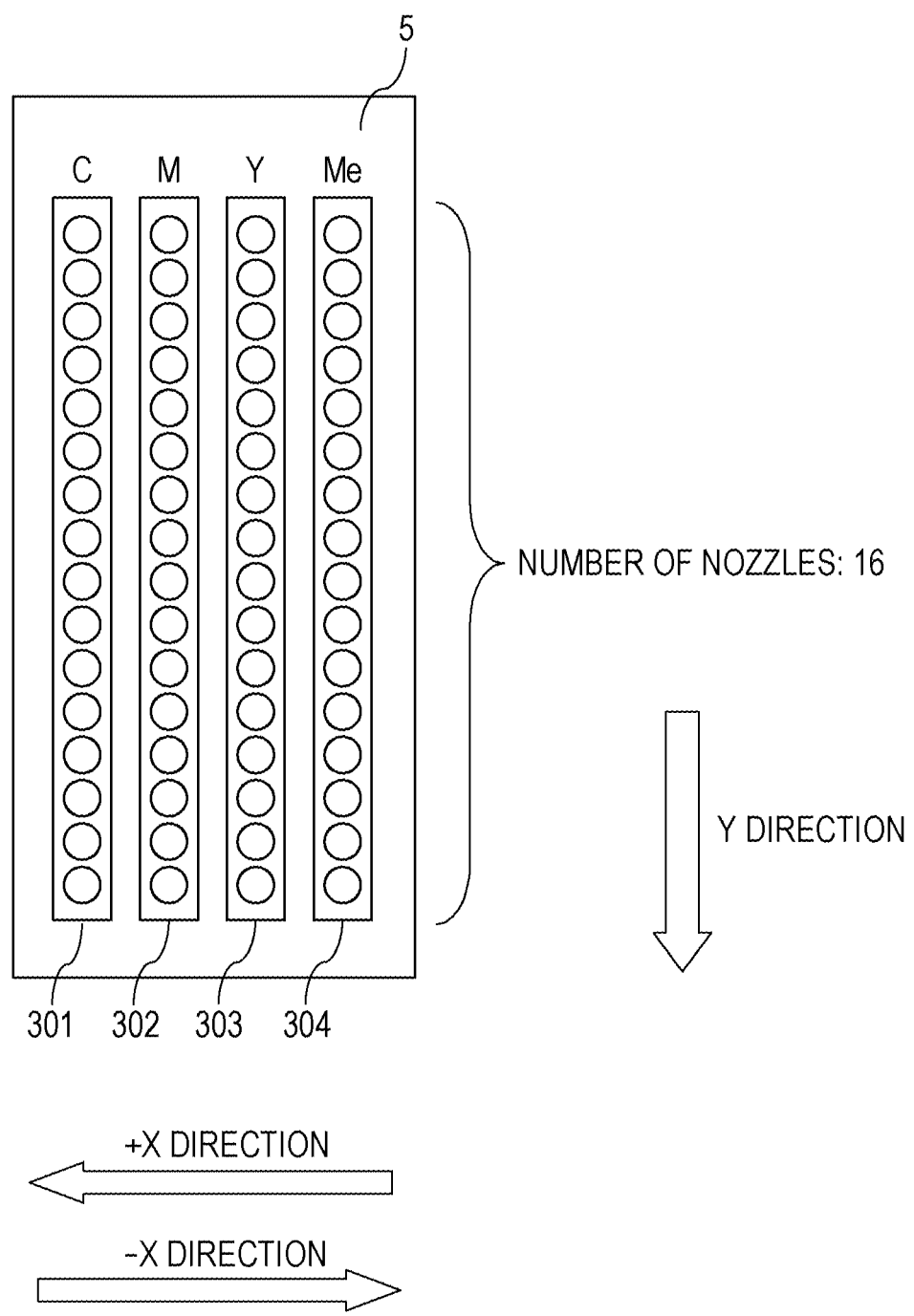
FIG. 3 is a view illustrating a recording head.

FIG. 3 is a view of the recording head 5 as viewed from the ejection port surface side. The recording head 5 has four ejection port rows 301, 302, 303, and 304 that are arranged in parallel in the X direction. Each of the ejection port rows 301 to 304 includes ejection ports for ejecting ink droplets, the ejection ports being arrayed in the Y direction of the figure at a pitch of 1200 dpi. In the figure, 16 ejection ports are arrayed as an example. Ink droplets of cyan (C) are ejected from the ejection port row 301. Ink droplets of magenta (M) are ejected from the ejection port row 302. Ink droplets of yellow (Y) are ejected from the ejection port row 303. Ink droplets of a metallic ink (Me) are ejected from the ejection port row 304. In the present embodiment, the direction in which the ejection ports are arrayed is the Y direction, which is the same as the direction in which the recording medium 2 is conveyed. However, the direction in which the ejection ports are arrayed is not necessarily the same direction as long as the direction intersects the scanning direction of the recording head 5.

Description of Recording Data

Figure 4:
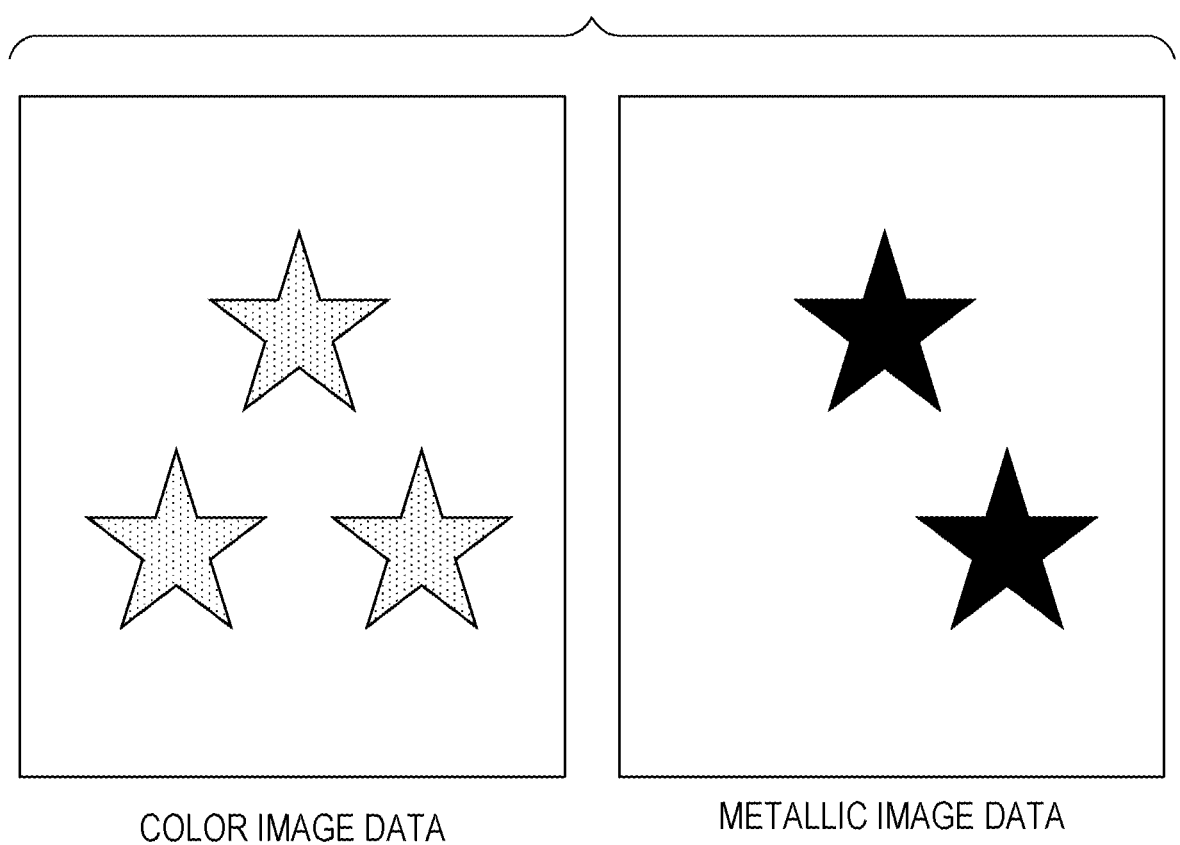
FIG. 4 includes diagrams illustrating an example of image data.

FIG. 4 illustrates an example of image data received from the image supply device 30 by the image processing device 20. In the present embodiment, the image processing device 20 receives two types of image data, namely, color image data for recording by using three color inks and metallic image data for recording by using a metallic ink. The color image data is a three-dimensional color image of R (red), G (green), and B (blue) each having a size of 8 bits for expressing a normalized color space such as the sRGB. On the other hand, the metallic image data is an 8-bit one-dimensional gray image that expresses the degree of luster of the metallic ink. The image size of the color image data is the same as the image size of the metallic image data. A region where an image is present in both the color image data and the metallic image data is a region expressed as a color metallic portion in recording.

Description of Image Processing Device

Figure 5:
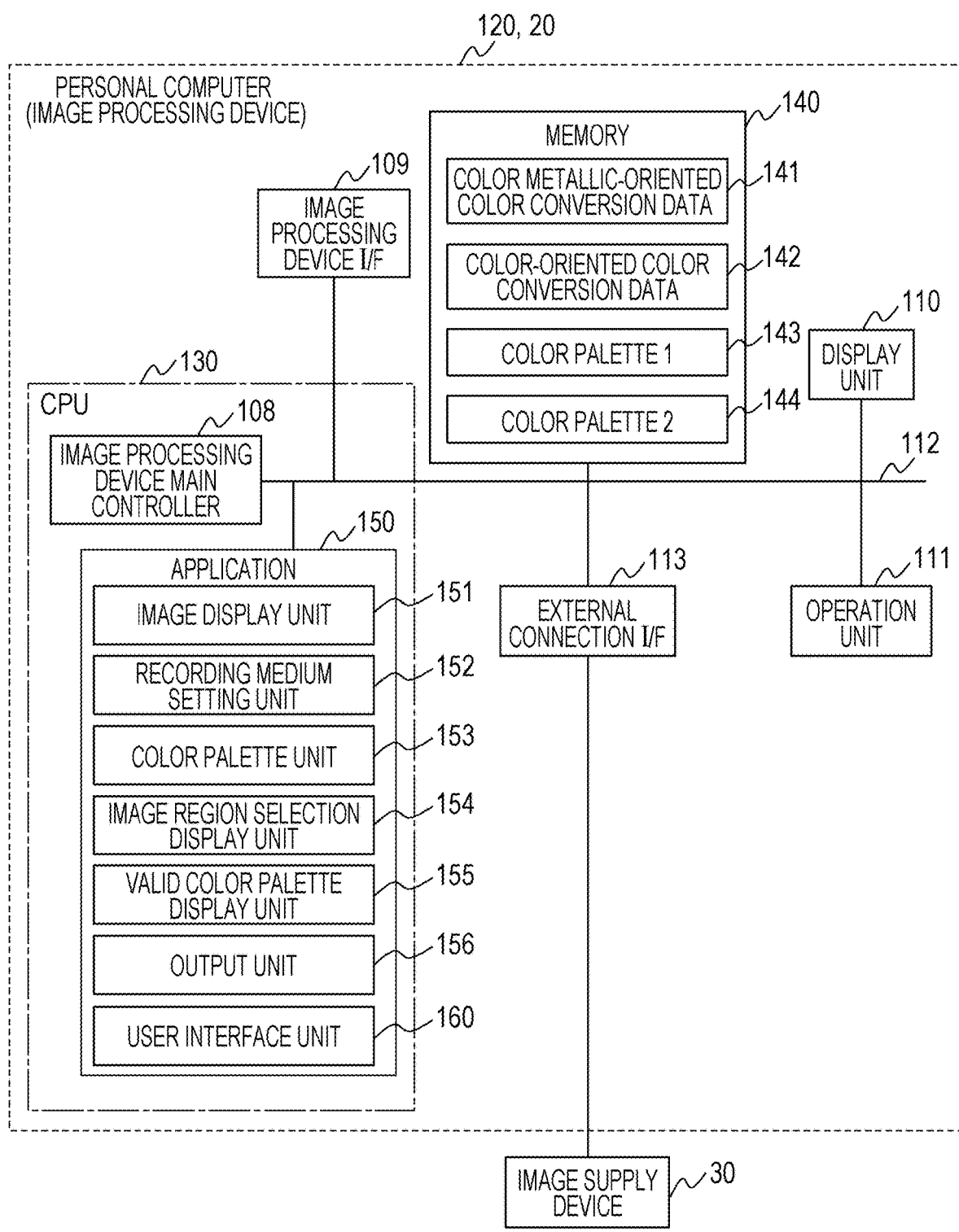
FIG. 5 is a diagram illustrating the configuration of an image processing device.

FIG. 5 is a diagram for more specifically illustrating the configuration of the image processing device 20. Here, a general-purpose personal computer 120 in which a predetermined program is installed as a data generation device is used as the image processing device 20. The personal computer 120 includes a CPU 130, a memory 140, an image processing device interface (I/F) unit 109, an external connection interface (I/F) unit 113, a display unit 110, and an operation unit 111. These are connected to an image processing device main controller 108 via a data bus 112. Various computer programs such as an application 150 and the image processing device main controller 108 are installed in the personal computer 120. The application 150 and the image processing device main controller 108 are executed by the CPU 130 under a predetermined operating system (not shown).

The memory 140 is a nonvolatile storage medium. The memory 140 stores color metallic-oriented color conversion data 141 and color-oriented color conversion data 142. The memory 140 further stores, for example, a plurality types of color palette data 143 and color palette data 144 in which metallic colors that can be reproduced in accordance with the type of the recording medium are set as defined colors. As described in detail later, in a color metallic image recorded in the ink jet recording device of the present embodiment, the degree of color development derived from a color material contained in a color ink varies depending on the type of recording medium. Accordingly, the defined colors of the color palettes are stored such that hues that exhibit the coloring effect by color materials are selected for each type of recording medium.

The application 150 is a program configured to realize an image editing function. The application 150 of the present embodiment has a metallic color selection display function which enables a metallic color that can be reproduced on recorded matter to be selected on the basis of the type of recording medium and the type of ink used in the ink jet recording device 10. This metallic color selection display function is realized by being incorporated in a dedicated application in advance or by a plug-in module added to a general-purpose application program. In order to realize the function, the application 150 includes an image display unit 151, a recording medium setting unit 152, a color palette unit 153, an image region selection display unit 154, a valid color palette display unit 155, and an output unit 156. Functions of these units will be described in detail later. A user can give an instruction for recording image data edited by the application 150 on the recording medium through a graphical user interface (GUI) provided by the application 150. In addition, the user can designate a region in which metallic luster is to be added by using a metallic ink with respect to a recording target image. Upon receiving the instruction of recording an image from the user, the application 150 outputs, to the image processing device main controller 108, image data that is a recording target. As described above, the image data output in the present embodiment is RGB format image data.

The image processing device main controller 108 has a function of generating recording data on the basis of the image data output from the application 150. This function will be described in detail later.

Description of Recording Data Generation Process

Figure 6:
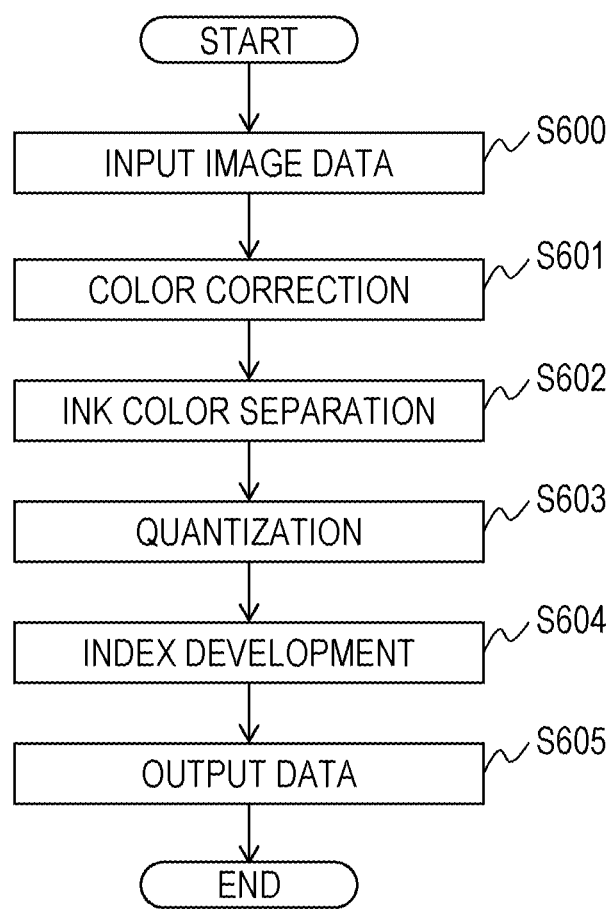
FIG. 6 is a flowchart illustrating image processing.

FIG. 6 is a flowchart illustrating image processing performed in the image processing device main controller 108. This processing is executed by the CPU 130 included in the personal computer 120 in accordance with a program stored in a ROM.

First, in step S600, color image data and metallic image data of target pixels are input from the image supply device 30. In step S601, color correction is executed by the image processing device main controller 108. The color image data is converted into RGB 12-bit luminance data corresponding to the color space inherent to the recording device. The method for converting a signal value may be a known method such as a method including referring to a lookup table (LUT) stored in, for example, a ROM in advance. On the other hand, the metallic image data is an 8-bit one-dimensional gray image and corresponds to the amount of application of the metallic ink. Therefore, color correction is not performed. In step S602, the RGB data after conversion is separated by the image processing device main controller 108 into 16-bit gradation data (density data) of each of C (cyan), M (magenta), and Y (yellow), which are ink colors of the recording device. At this stage, 16-bit one-dimensional gray images for three channels (for three colors) are generated. In the ink color separation process, a known method such as a method including referring to a lookup table (LUT) stored in, for example, a ROM in advance can be used as in the color correction process. Since the metallic image data is an 8-bit gray image corresponding to the metallic (Me) ink, the process is not performed here.

In step S603, the image processing device main controller 108 performs a predetermined quantization process for the gradation data corresponding to each of the ink colors to convert the gradation data into several-bit quantization data. For example, in the case where the gradation data is quantized into three values, the gradation data is converted into 2-bit data at level 0 to level 2. In subsequent step S604, an index development process is performed by the image processing device main controller 108. Specifically, among a plurality of dot arrangement patterns in which the positions and the number of dots recorded on respective pixels are determined, one dot arrangement pattern is selected by being associated with the level determined in step S603. In this case, the dot arrangement patterns may have a form in which the number of dots recorded in a region corresponding to each pixel is varied depending on the level value or a form in which the size of the dots is varied depending on the level value. In step S605, output data that has been subjected the index development in step S604 is output. Thus, this flow is completed.

The steps described in each of the steps in FIG. 6 may be executed by either the image processing device 20 or the recording device 10 in the ink jet recording system of the present embodiment. For example, in the case where steps up to the quantization process are performed in the image processing device 20, the data after quantization is transferred to the recording device 10, and an index development is performed by the recording device main controller 101 using an index pattern stored in a data buffer 106 to control recording operation. A recording device 10 having a certain performance can directly receive multi-value color image data and metallic image data and perform all the steps.

Fusion of Silver Ink

Next, a description will be made of a state of dot formation on a recording medium by a metallic ink, which is one feature of the present embodiment, and a process in which metal particles in the metallic ink form a film. Hereafter, a silver nanoparticle ink (hereinafter also referred to as a "silver ink") that contains, as metal particles, silver particles having a particle size on the order of nanometer, the silver particles being dispersed in a solvent, will be described as an example of the metallic ink used.

Figure 20A:
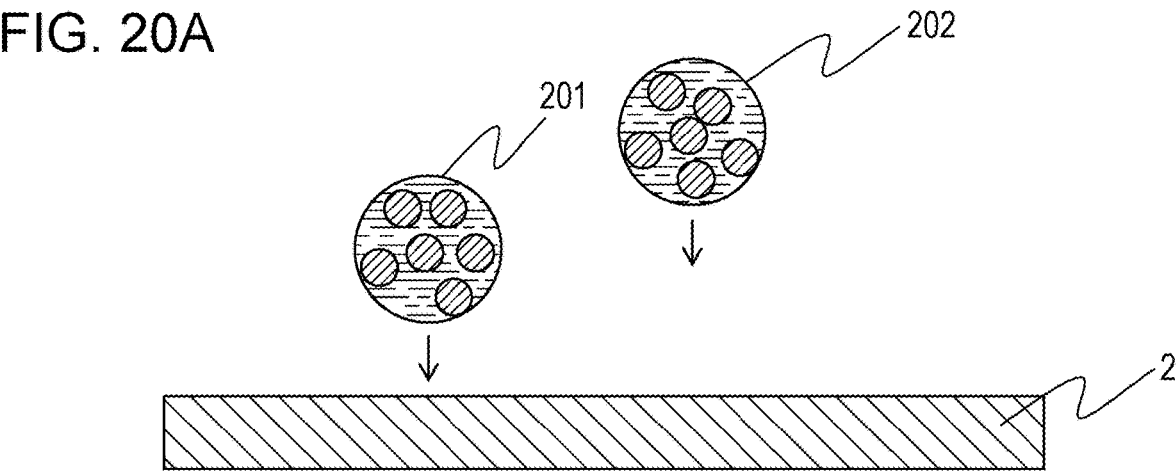
FIGS. 20A to 20D are views illustrating formation of a film when a metallic ink is applied.

FIGS. 20A to 20D are schematic views illustrating dot formation and film formation when a plurality of silver ink droplets are applied to a recording medium, as viewed from a cross-sectional direction of a recording medium 2. A description will be made of a state where, after a first ink droplet is applied, a second ink droplet is subsequently applied. FIG. 20A illustrates a first ink droplet 201 immediately before landing on the recording medium 2 and a second ink droplet 202 ejected after a certain period of time from the ejection of the first ink droplet 201. Each of the ink droplets contains silver particles 203 and a solvent 204. The silver particles contained in the ink droplets are in a state of being dispersed in the solvent as silver particles having a particle size on the order of nanometer, and achromatic silver luster is not exhibited due to the plasmon effect. Thus, the silver particles exhibit another color.

Figure 20B:
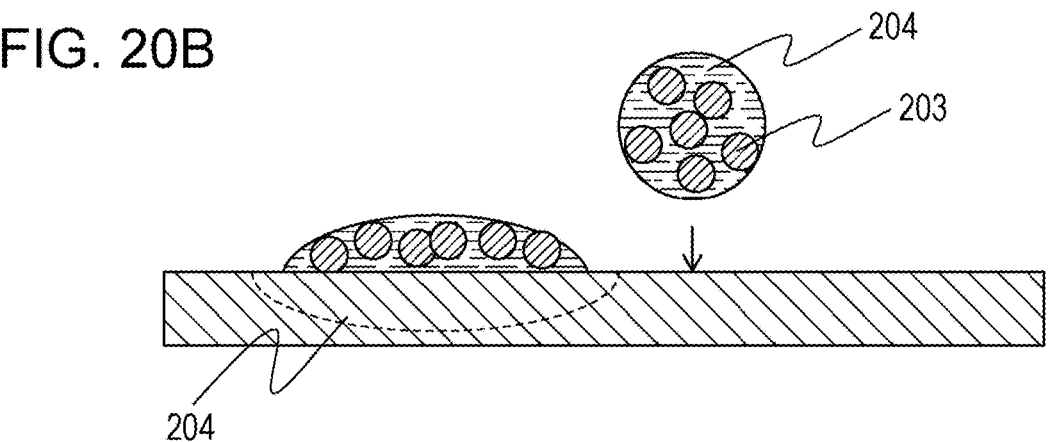
Figure 20C:
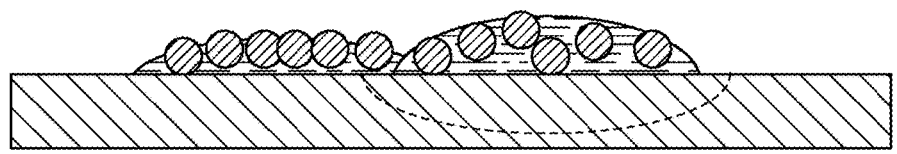
Figure 20D:
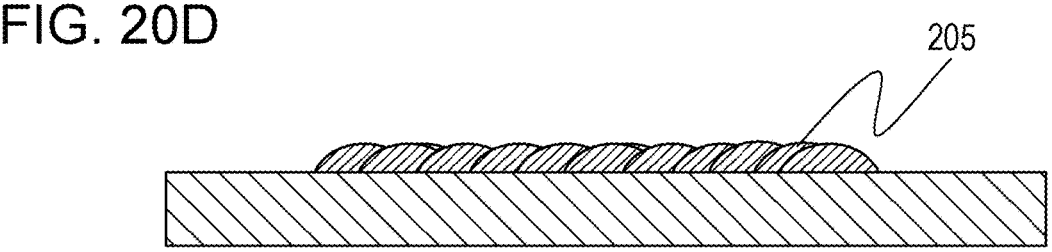

Next, as illustrated in FIG. 20B, the first ink droplet 201 lands on the recording medium 2 prior to the second ink droplet 202. The solvent 204 in the first ink droplet 201, which has landed earlier, permeates into the recording medium or evaporates from the surface of the ink droplet. As a result, the amount of the solvent decreases. Accordingly, the silver particles 203 come in contact with each other, and an increase in the particle size and a change in the shape of the silver particles thereby proceed. As a result, as illustrated in FIG. 20C, a silver particle film in which the silver particles gather densely is formed near the surface of the recording medium. The plasmon effect decreases, and achromatic silver luster is exhibited. While the formation of the silver particle film of the first ink droplet 201, which has landed earlier, proceeds, the subsequent second ink droplet 202 lands near the first ink droplet 201. In the second ink droplet 202, a silver particle film is similarly formed with permeation or evaporation of the solvent. At this time, as illustrated in FIG. 20D, when these ink droplets in the course of the formation of the silver particle film are in contact with each other, the ink droplets are combined to each other to form a silver particle film 205.

Configuration of Ink

Next, a description will be made of components that form a metallic ink containing metal particles and used in the present embodiment.

Metal Particle-Containing Ink

Metal Particle

The content (% by mass) of metal particles in the ink is preferably 0.1% by mass or more and 30.0% by mass or less, more preferably 1.0% by mass or more and 15.0% by mass or less based on the total mass of the ink.

Specific examples of the metal particles include, but are not particularly limited to, particles of gold, silver, copper, platinum, aluminum, titanium, chromium, iron, nickel, zinc, zirconium, and tin. These metal particles may be made of an elemental metal or an alloy and can be used in combination of two or more thereof. From the viewpoints of storage stability of the metal particles and luster of an image to be formed, gold particles, silver particles, and copper particles are preferably used, and silver particles are particularly preferably used as the metal particles. Silver particles are particularly good from the viewpoint that a wide range of metallic colors can be expressed in combination with color inks due to high luster and achromaticity of an image to be formed. As described above, a silver particle-containing ink is used as the metal particle-containing ink in the present embodiment.

Silver Particle

The silver particles used in the present embodiment are particles containing silver as a main component. Silver in the silver particles has a purity of 50% by mass or more. For example, the silver particles may contain, as accessory components, another metal, oxygen, sulfur, carbon, and the like. The silver particles may be made of an alloy.

The method for producing the silver particles is not particularly limited. However, in consideration of particle size control and dispersion stability of the silver particles, the silver particles are preferably those produced from a water-soluble silver salt by a synthesis method using a reduction reaction.

The average particle size of the silver particles used in the present embodiment is preferably 1 nm or more and 200 nm or less, more preferably 10 nm or more and 100 nm or less from the viewpoints of storage stability of the ink and luster of an image formed by the silver particles.

The average particle size can be specifically measured by using, for example, FPAR-1000 (manufactured by Otsuka Electronics Co., Ltd., analysis by a cumulant method) or Nanotrac UPA150EX (manufactured by Nikkiso Co., Ltd., using a 50% cumulative value of a volume-average particle size), which utilizes laser beam scattering.

In the present embodiment, the content (% by mass) of silver particles in the ink is preferably 2.0% by mass or more and 15.0% by mass or less based on the total mass of the ink. At a content of less than 2.0% by mass, metallic luster of an image may decrease. At a content of more than 15.0% by mass, ink overflow tends to occur, which may generate printing position errors.

Dispersant

The dispersion form of the silver particles is not particularly limited. Examples of the silver particles that can be used include silver particles dispersed by using a surfactant and resin-dispersion silver particles dispersed by using a dispersion resin. Metal particles having different dispersion forms can also be used in combination.

Examples of the surfactant that can be used include anionic surfactants, nonionic surfactants, cationic surfactants, and amphoteric surfactants. Specifically, for example, the following surfactants can be used.

Examples of the anionic surfactants include fatty acid salts, alkyl sulfates, alkyl aryl sulfonates, alkyl diaryl ether disulfonates, dialkyl sulfosuccinates, alkyl phosphates, naphthalene sulfonic acid formalin condensate, polyoxyethylene alkyl phosphates, and glycerol borate fatty acid esters.

Examples of the nonionic surfactants include polyoxyethylene alkyl ethers, poly(oxyethylene-oxypropylene) block copolymers, sorbitan fatty acid esters, glycerin fatty acid esters, polyoxyethylene fatty acid esters, polyoxyethylene alkylamines, fluorine-containing surfactants, and silicon-containing surfactants. Examples of the cationic surfactants include alkylamine salts, quaternary ammonium salts, alkyl pyridinium salts, and alkyl imidazolium salts.

Examples of the amphoteric surfactants include alkylamine oxides and phosphatidyl choline.

Any resin having water solubility or water dispersibility can be used as the dispersion resin. Among these, in particular, a dispersion resin having a weight-average molecular weight of 1,000 or more and 100,000 or less, further, 3,000 or more and 50,000 or less is preferred.

Specific examples of the dispersion resin that can be used include polymers obtained from a monomer such as styrene, vinylnaphthalene, aliphatic alcohol esters of α,β-ethylenically unsaturated carboxylic acids, acrylic acid, maleic acid, itaconic acid, fumaric acid, vinyl acetate, vinyl pyrrolidone, acrylamide, or a derivative thereof. Among monomers constituting the polymer, at least one monomer is preferably a hydrophilic monomer. A block copolymer, a random copolymer, a graft copolymer, a salt thereof, or the like may be used. Alternatively, a natural resin such as rosin, shellac, or starch can also be used.

In the present embodiment, the aqueous ink contains a dispersant for dispersing the silver particles. The content of the dispersant (% by mass) is preferably 0.02 times or more and 3.00 times or less the content (% by mass) of the silver particles in terms of mass ratio.

When the mass ratio is less than 0.02 times, dispersion of the silver particles is unstable, a ratio of silver particles adhering to a heat-generating portion of the head increases, and thus abnormal bubbling is more likely to occur. Consequently, printing position errors due to ink overflow may be generated. When the mass ratio exceeds 3.00 times, the dispersant inhibits fusion of the silver particles during image formation, which may decrease metallic luster of the image.

Surfactant

The silver particle-containing ink used in the present embodiment preferably contains a surfactant therein in order to obtain more balanced ejection stability. The anionic surfactants, nonionic surfactants, cationic surfactants, and amphoteric surfactants described above can be used as the surfactant.

Among these, nonionic surfactants are preferably contained. Among nonionic surfactants, polyoxyethylene alkyl ethers and an ethylene oxide adduct of acetylene glycol are particularly preferred. These nonionic surfactants each have a hydrophile-lipophile balance (HLB) value of 10 or more. The content of the surfactant used in combination is preferably 0.1% by mass or more in the ink. The content of the surfactant is preferably 5.0% by mass or less, more preferably 4.0% by mass or less, and still more preferably 3.0% by mass or less.

Aqueous Medium

In the silver particle-containing ink used in the present embodiment, an aqueous medium containing water and a water-soluble organic solvent is preferably used. The content (% by mass) of the water-soluble organic solvent in the ink is 10% by mass or more and 50% by mass or less, more preferably 20% by mass or more and 50% by mass or less based on the total mass of the ink. The content (% by mass) of water in the ink is preferably 50% by mass or more and 88% by mass or less based on the total mass of the ink.

Specific examples of the water-soluble organic solvent that can be used include alkyl alcohols such as methanol, ethanol, propanol, propanediol, butanol, butanediol, pentanol, pentanediol, hexanol, and hexanediol; amides such as dimethylformamide and dimethylacetamide; ketones and keto-alcohols such as acetone and diacetone alcohol; ethers such as tetrahydrofuran and dioxane; polyalkylene glycols having an average molecular weight of, for example, 200, 300, 400, 600, or 1,000, such as polyethylene glycol and polypropylene glycol; alkylene glycols having an alkylene group with 2 to 6 carbon atoms, such as ethylene glycol, propylene glycol, butylene glycol, triethylene glycol, 1,2,6-hexanetriol, thiodiglycol, hexylene glycol, and diethylene glycol; lower alkyl ether acetates such as polyethylene glycol monomethyl ether acetate; glycerin; and lower alkyl ethers of polyhydric alcohols such as ethylene glycol monomethyl (or ethyl) ether, diethylene glycol methyl (or ethyl) ether, and triethylene glycol monomethyl (or ethyl) ether.

Deionized water (ion-exchanged water) is preferably used as the water.

Other Components

The silver particle-containing ink used in the present embodiment may optionally contain various additives such as a pH adjuster, a rust inhibitor, a preservative, a fungicide, an antioxidant, a reducing inhibitor, an additional resin, and an evaporation promoter.

A metallic color image of the present embodiment includes an achromatic metallic luster layer formed by silver particles and a colored layer containing a color material and formed on the metallic luster layer. The metallic color image is obtained as a luster image having a tint due to a coloring effect derived from a color ink. In this case, light that is emitted from a light source and that enters the colored layer is reflected at the metallic luster layer, and the light that passes through the colored layer again is recognized as a metallic color. That is, since the reflectivity of the metallic luster layer and the color developability of the colored layer are factors that control the color developability of the metallic color, the colored layer is required to have transparency in addition to the color developability. In the present embodiment, a description will be made of a configuration that uses, as the colored layer, a dye-containing ink that contains a dye as a color material having good color developability and good transparency.

Dye-Containing Ink

Dye

In the present embodiment, a dye-containing ink is applied to a silver layer formed by using a silver particle-containing ink that is applied to a recording medium in advance. A dye in the dye-containing ink aggregates and remains on the silver layer to thereby form a metallic color image that exhibits a desired color. The use of a dye as a color material of a color ink can provide a metallic color image having transparency.

As a result of studies conducted by the inventors of the present disclosure, it has been found that the coloring effect as a color metallic image varies depending on the type of dye in a dye-containing ink. Specifically, there are dyes that easily remain on a silver layer and strongly exhibit the coloring effect as a color metallic image and dyes that partially permeate under a silver layer and weakly exhibit the coloring effect as a color metallic image. With regard to this difference in the type of dye, the inventors of the present disclosure consider as follows. The ease of aggregation of a dye varies depending on the difference in structure of the dye. Dyes that easily aggregate associate and form molecular aggregates. For example, it is assumed that association of molecules is caused by dipole-dipole interaction. In the case where a plurality of molecules having different electronegativities are bound to each other, delocalization (polarization) of electrons occurs between atoms of these, and the molecules are electrostatically attracted to each other by the polarization. In general, compounds having an unshared electron pair, such as compounds having a carbonyl group or a heteroaromatic ring, and compounds which have a plurality of unshared electron pairs and in which the unshared electron pairs are conjugated tend to associate, although it depends on the case. For example, heteroaromatic rings include a nitrogen atom or sulfur atom, which has an unshared electron pair. Therefore, heteroaromatic rings have higher electronegativity than a benzene ring, and thus electric charges are delocalized in the heteroaromatic rings. In the case where a plurality of unshared electron pairs are conjugated, it is considered that the unshared electron pairs move through the conjugation, resulting in polarization.

Accordingly, in the case where an ink that contains a dye having a high aggregation property is applied to a silver layer, the dye aggregates on the silver layer and remains on the silver layer as a colored layer. As a result, the tint in the resulting color metallic image is strongly developed. For example, when a cyan dye has a high aggregation property, a cyan metallic image develops a cyan color strongly because of a large amount of the cyan dye remaining in the colored layer. In contrast, when an ink containing a dye having a low aggregation property is applied to a silver layer, a part of the dye permeates from pores into the silver layer together with an aqueous medium and water contained in the ink. Therefore, the amount of dye that serves as a colored layer remaining on the silver layer decreases, and the tint in the resulting color metallic image is weakly developed. For example, when a magenta dye has a low aggregation property, a magenta metallic image develops a magenta color weakly and has a color close to the silver layer itself because of a small amount of the magenta dye remaining in the colored layer.

An index of such an aggregation property of a dye can be represented by using a small-angle X-ray scattering method. Two methods will be described below.

In a first method, a d value which is a distance between particles is determined from a value of 2θ obtained from a peak top of a scattering angle profile by using formula (1) below on the basis of the Bragg equation:

$$2d \sin \theta = n\lambda \quad \text{Formula (1)}$$

where λ represents the wavelength of X rays, d represents the distance between particles, and θ represents the scattering angle.

The d value calculated herein is considered to be the center-to-center distance of particles that are arranged at regular intervals. The d value measured by this method is considered to be an index indicating the size of a molecular aggregate. It is considered that, with an increase in the d value, the size of a molecular aggregate formed by dye molecules increases.

A second method is a method in which a peak intensity of the scattering angle profile is determined. The peak shape of the scattering angle profile indicates the distribution of a dispersion distance of molecular aggregates. As described above, considering that this dispersion distance is an index of the size of a molecular aggregate, the scattering angle profile is considered to indicate the distribution of the sizes of molecular aggregates in a solution. Assuming that the peak intensity of the scattering angle profile represents molecular aggregates in a solution, it is considered that the higher the frequency of molecular aggregates, that is, the higher the peak intensity, the higher the aggregation property.

When the above value is measured by small-angle X-ray scattering, it is necessary to make the molecular density in the solution uniform. For example, the measurement of small-angle X-ray scattering is performed for a 5 mass % aqueous dye solution having a uniform dye concentration. Since the peak intensity varies depending on the apparatus, measurement conditions, and the like, a dye serving as a reference may be determined as an index of the peak intensity. For example, C.I.Direct Yellow 132 is used as the reference. Among dye-containing inks, C.I.Direct Yellow 132 has insufficient probability of association. When a dye has a more sufficient peak intensity than C.I.Direct Yellow 132, the dye can be determined to have high probability of association and a high aggregation property among dye-containing inks.

As described above, in the present embodiment, a dye C ink, a dye M ink, a dye Y ink are used as color inks containing color materials, and the C ink, the Y ink, and the M ink have a high aggregation property in descending order. These inks have substantially the same physical property values other than the aggregation property, in particular, the viscosity, surface tension, permeability in paper, etc.

The inventors of the present disclosure have found that when an image that includes a color metallic portion is recorded by using the metallic ink and the color inks described above, the coloring effect of metallic colors is not obtained in some cases depending on the type of recording medium used. Even when a metallic ink and a color ink are applied under the same conditions, metallic colors that cannot be reproduced are generated in some types of recording media used. Furthermore, as a result of studies conducted by the inventors of the present disclosure, it has been found that metallic colors that can be reproduced vary depending on the combination of a color ink and a recording medium used.

In the present embodiment, it is determined that the coloring effect is obtained when a color difference between a metallic color recorded by using a metallic ink alone and a color metallic color recorded by using the metallic ink and a color ink can be recognized by the human eyes. Whether the coloring effect is obtained or not can be determined by the following method. Herein, a recording density (recording duty) in which one ink droplet having a weight of 4 ng is applied to one pixel at 1200 dpi×1200 dpi is defined as 100%. A color of a metallic portion to which a metallic ink is applied at a recording duty of 100% is measured. Next, a color of a color metallic portion to which the metallic ink is applied at a recording duty of 100% and a color ink is then applied at a recording duty of 100% is measured. When the color difference between these colors is equal to or smaller than a predetermined threshold value, it is determined that the coloring effect is not obtained. When the color difference between these colors is larger than the predetermined threshold value, it is determined that the coloring effect is obtained. The predetermined threshold value can be, for example, color difference $\Delta E=3$ in the CIELab color space. This is a value of the color difference that can be generally recognized as different colors by the human eyes.

Aqueous Medium and Other Components

Regarding an aqueous medium and other components, components that are the same as those of the silver particle-containing ink can be used.

Next, physical properties of the silver particle-containing ink and a dye-containing ink, each of which is an aqueous ink, will be described.

Physical Properties of Ink

The aqueous ink of the present embodiment has a viscosity of 1.0 mPa·s or more and 5.0 mPa·s or less at 25° C. At a viscosity of more than 5.0 mPa·s, the supply of the ink to nozzle holes may be insufficient during continuous printing, and stable ejection may be inhibited. The viscosity is more preferably 3.0 mPa·s or less.

The present embodiment suitably acts on the problem generated only by the following combination. The combination is specifically a combination of accelerated precipitation of silver particles and accelerated evaporation of the aqueous medium, the accelerated precipitation being generated when the silver particles are used in the low-viscosity range described above, the accelerated evaporation being caused by heating and heat accumulation near nozzle holes generated when using a recording device used in the configuration of the present embodiment.

The aqueous ink of the present embodiment preferably has a static surface tension of 10 mN/m or more and 60 mN/m or less at 25° C., more preferably 20 mN/m or more and 60 mN/m or less at 25° C., and particularly preferably 30 mN/m or more and 40 mN/m or less at 25° C. When the ink used in the present embodiment and having a surface tension within the above range is used in an ink jet system, for example, generation of ejection position errors (misalignment of landing points of the ink) due to wetting near the ejection ports can be effectively suppressed. The surface tension of the ink can be adjusted by appropriately determining the content of, for example, the surfactant in the ink. The pH of the ink used in the present embodiment is preferably adjusted to a desired value so as to obtain good ejection characteristics when the ink is used in an ink jet recording device.

Image Editing and Recording Processing

Figure 7:
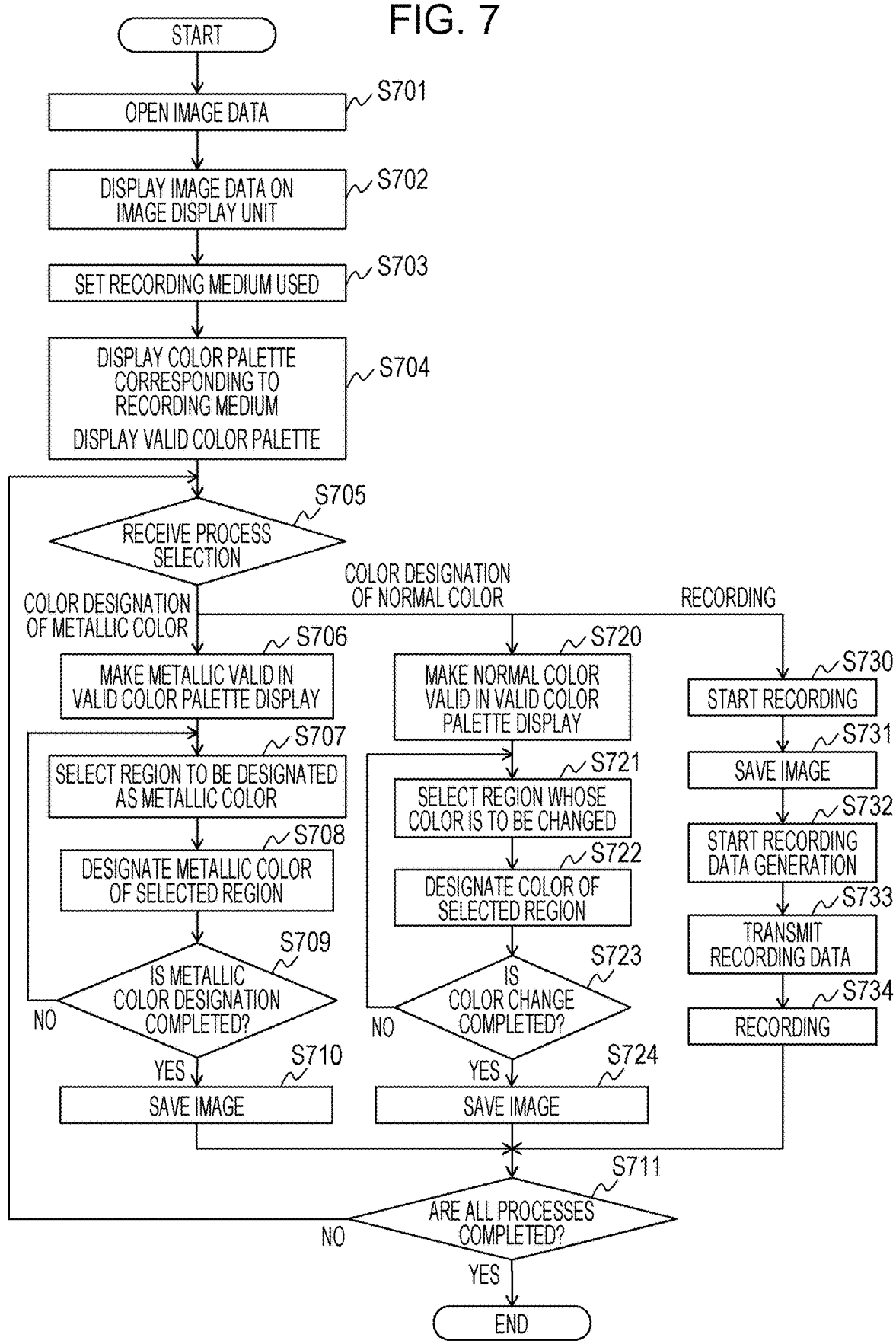
FIG. 7 is a flowchart illustrating a flow of image editing and recording processing.

FIG. 7 is a flowchart illustrating a flow of image editing and recording processing using an application in the recording system of the present embodiment. The image editing and recording processing in this figure are processes in which the personal computer 120 which is an image processing device converts image data generated by the application 150 into recording data and outputs the recording data to the ink jet recording device 10.

In step S701, an image data file present in the image supply device 30 is opened by the application 150 to start editing the image data. In step S702, the image display unit 151 serving as an image editing screen is displayed on the display unit 110 as a preview by a user interface unit 160 of the application 150.

Figure 8:
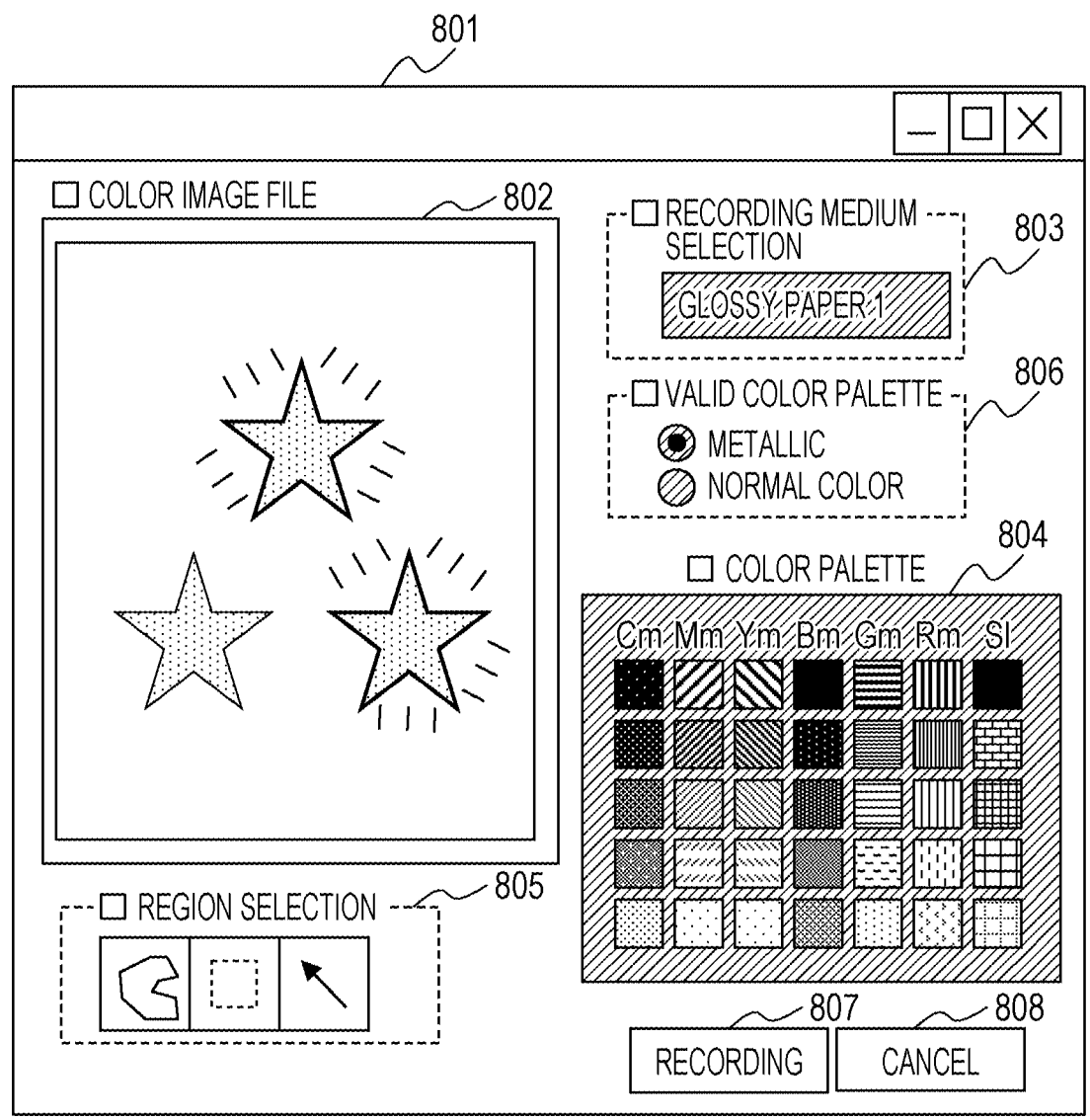
FIG. 8 is a diagram illustrating an application screen.

FIG. 8 illustrates an example of the entire screen displayed when the image data illustrated in FIG. 4 is opened by the application 150. As described above, the color image data is a three-dimensional color image of R, G, and B each having a size of 8 bits, and the metallic image data is an 8-bit one-dimensional gray image. On the application, a color image region and a metallic image region are displayed so as to be distinguished from each other on the basis of the above two images. For example, in the metallic image data, a region where metallic luster is to be added is provided with a display effect such as repetitive blinking on the screen.

The display screen includes an entire application display unit 801 which is a display screen of the entirety of the application and an image display unit 802 on which the image data opened by the application is displayed as a preview. The entire application display unit 801 includes a recording medium selection display unit 803 configured to select and set a recording medium used and a color palette unit 804 configured to select a color used. The image display unit 802 of image data includes a selected region setting unit 805 configured to select and display at least a part of an image region of the image data.

A valid color palette display unit 806 is configured to select whether the color of a selected portion of the image region is designated by a normal color or a color using a metallic ink. In response to selection of a recording button 807, recording of the edited image data is executed. In response to selection of a cancel button 808, the process is cancelled. At the time of completing up to step S702, the display contents of the image display unit 802 are updated. The display on the selected region setting unit 805, the recording button 807, and the cancel button 808 are not particularly updated. With regard to display items other than the above, since the recording medium selection display unit 803, the color palette unit 804, and the valid color palette display unit 806 do not satisfy conditions under which the display becomes valid, the display of each of these units is invalidated (denoted by hatching in FIG. 8). In the present embodiment, a process of invalidating the display is carried out as an initialization operation when the image data is opened. However, the initialization operation is not limited thereto. For example, in the case where recording is performed by using a normal color ink without using a metallic ink, normal glossy paper is displayed in the recording medium selection display unit 803 in which a recording medium used is selected and set. Furthermore, for example, the color palette unit 804 in which a color used is selected preferably displays a normal color palette, and the valid color palette display unit 806 preferably displays that the normal color is valid.

Next, referring back to FIG. 7, in step S703, in a unit configured to set a recording medium used, a recording medium used for recording is selected from a list to thereby acquire medium information. In the case where the list does not include the recording medium used, another type of recording medium that exhibits closer characteristics of the coloring effect in a color metallic image is selected.

Figure 9:
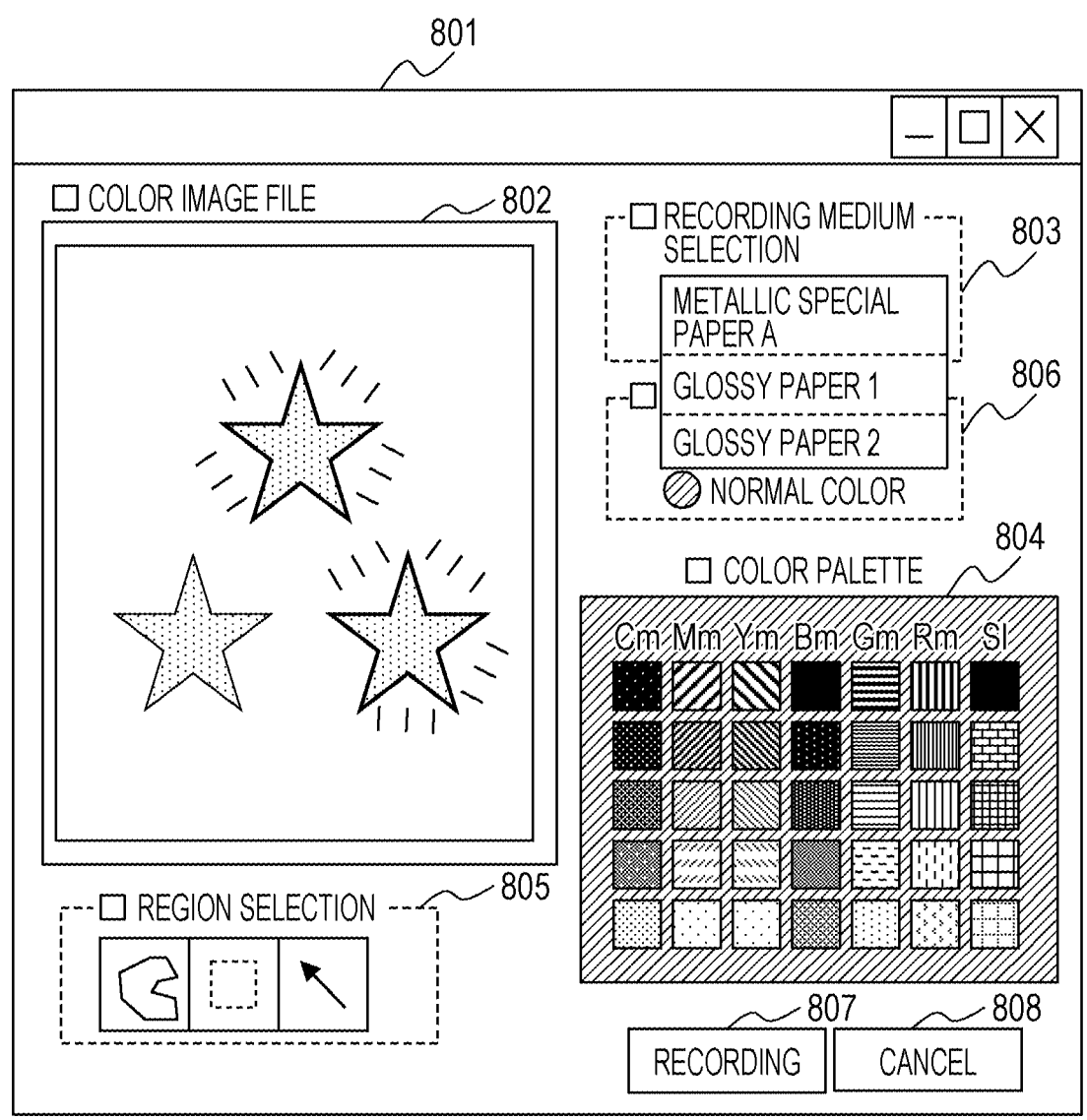
FIG. 9 is a diagram illustrating an application screen.

FIG. 9 illustrates examples of the recording medium displayed on the recording medium selection display unit 803 in the entire application display unit 801, and a desired recording medium is selected from a selection menu. In this example, for example, "metallic special paper A", "glossy paper 1", and "glossy paper 2" can be selected.

Referring back to FIG. 7, in step S704, color palette information corresponding to the type of the selected recording medium is read from the memory 140 by the image processing device main controller on the basis of the medium information and set in the color palette unit 804. In response to setting of the color palette information in the color palette unit 804, a plurality of display items corresponding to defined colors included in the color palette set above are displayed at positions at which a color palette is shown in the entire application display unit 801. Next, information about the display items is input by the user, and the selection of a metallic color is received. At this time, reproducible metallic colors used for metallic recording are displayed as colors that are initially selected. The valid color palette display unit 806 is displayed so that metallic colors are recognized to be valid. In this example, it is assumed that the "metallic special paper A" is selected by the user.

Figure 10:
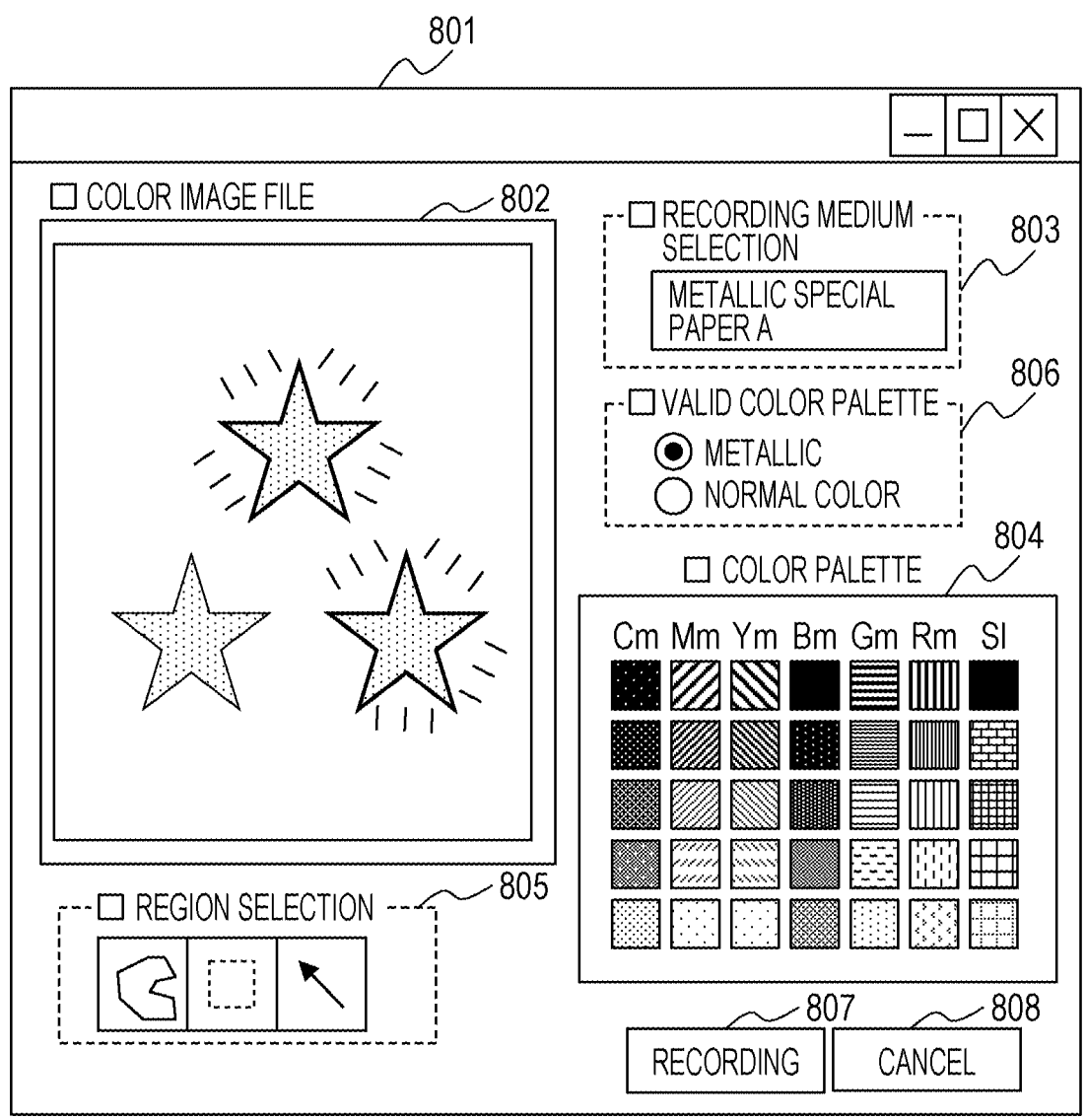
FIG. 10 is a diagram illustrating an application screen.

FIG. 10 illustrates an example of the color palette unit 804 and the valid color palette display unit 806 configured to indicate a color palette that is valid at present in the entire application display unit 801. The color palette unit 804 is configured so that a color is selected from a screen on which different colors are arranged in a tile-like manner. Specifically, the color palette unit 804 is displayed at a concentration of five grades for each of seven hues of cyan metallic Cm, magenta metallic Mm, yellow metallic Ym, blue metallic Bm, green metallic Gm, red metallic Rm, and silver S1 hues. The silver (S1) refers to a color recorded by using a metallic ink alone without using a color ink.

The method of arrangement of the color palette is not limited to the tile-like arrangement. Alternatively, the colors may be continuously arranged on a circumference of a circle. An instruction is output so that, for the recording medium set in step S703, only colors whose color metallic luster can be reproduced, that is, only colors formed by combinations that achieve a coloring effect are arranged on the color palette. In other words, the instruction is output so as to display a color palette that is restricted such that hues for which a coloring effect is not achieved and whose color metallic image cannot be reproduced are not designated. The "metallic special paper A" selected in the example in FIG. 10 is special paper for recording with a metallic ink. That is, in the case where a metallic ink and a color ink are applied to the "metallic special paper A" one over the other, the coloring effect for all the seven hues described above is achieved. Accordingly, the display items displayed on the color palette are not restricted, and all the seven hues that can be displayed on the color palette are displayed. An example of the metallic special paper that can be used is a recording medium that contains an aggregating agent having an effect of aggregating a color material in a color ink. Even in the case of using an ink containing a color material having a low aggregation property (magenta ink in the present embodiment) as described above, incorporation of the aggregating agent enables the color material to be aggregated and remain on a silver layer, thus achieving a coloring effect derived from the color material of the color ink.

Furthermore, in the valid color palette display unit 806, "metallic", "normal color", or the like can be selected as the type of valid color palette by a radio button. In the present embodiment, a metallic color is preferentially designated. When the recording medium is selected in step S703, the display of the radio button on the left side of "metallic" in the valid color palette display unit 806 is enabled. The display contents of the valid color palette display unit are not limited to this as long as distinction of the color palette can be performed. The method for selecting a valid color palette is also not limited to a radio button as long as one color palette can be selected from a plurality of color palettes.

Referring back to FIG. 7, in step S705, selection of a process for the image data performed by the user is received. The type of the process can be selected from processes of "color designation of metallic color", "color designation of normal color", and "recording". In the case where "color designation of normal color" is selected, the process proceeds to step S720. In the case where "recording" is selected, the process proceeds to step S730.

Here, the correlation between each process and each display unit in the entire application display unit 801 will be described. In the case where, in step S703, a recording medium used is selected in the recording medium selection display unit 803 or in the case where the radio button of "metallic" is selected and displayed as a valid color palette in the valid color palette display unit 806, the process of "color designation of metallic color" is carried out. In the case where the radio button of "normal color" is selected and displayed as a valid color palette in the valid color palette display unit 806, the process of "color designation of normal color" is carried out. In response to selection of the recording button 807, the process of "recording" is carried out.

In the case where the process of "color designation of metallic color" is carried out, in step S706, the radio button of "metallic" is selected and displayed as a valid color palette in the valid color palette display unit 806. Subsequently, in step S707, selection of a region in which metallic luster is to be added by the user is received.

Figure 11:
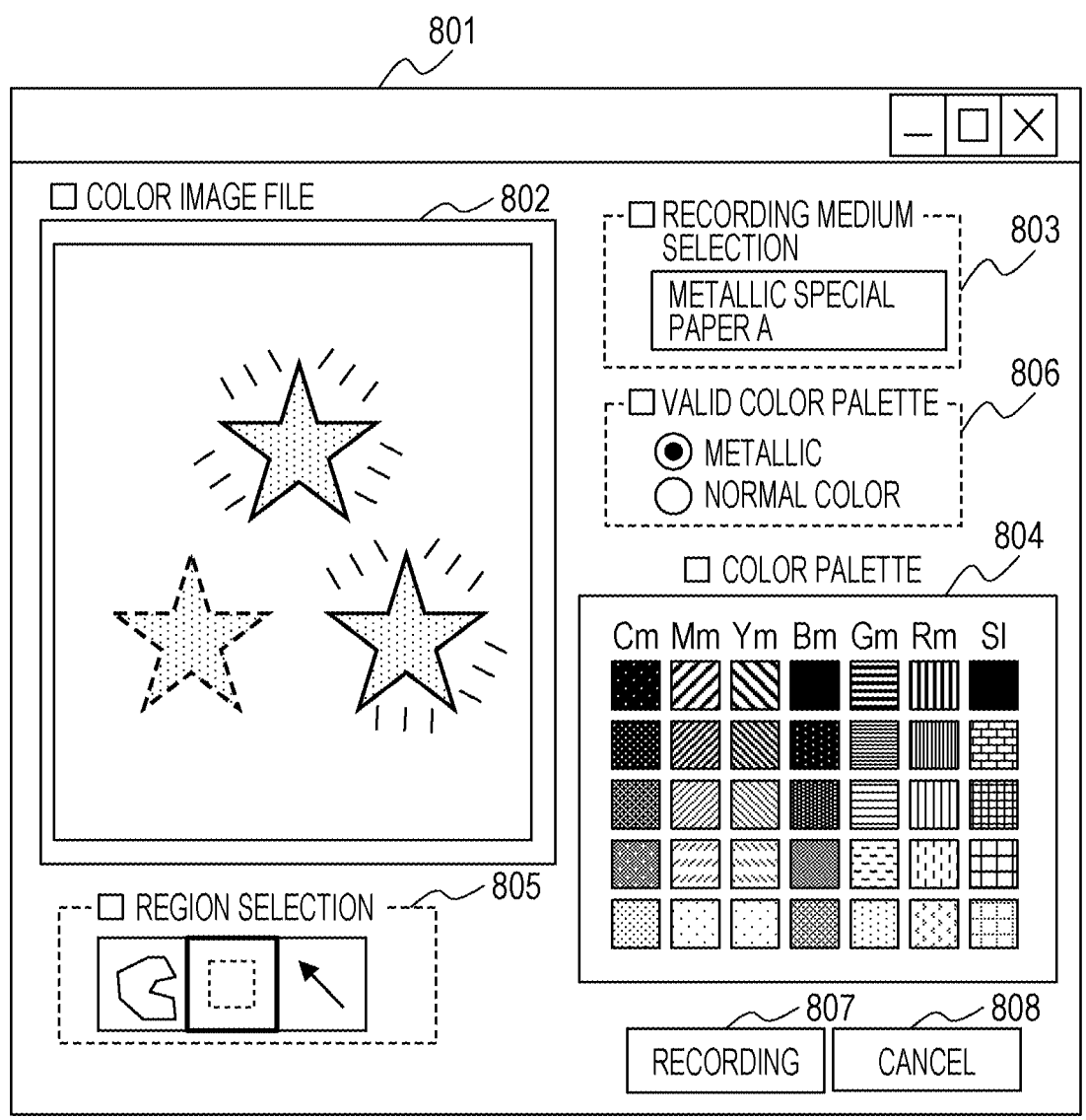
FIG. 11 is a diagram illustrating an application screen.

FIG. 11 illustrates an example of display of the selected region setting unit 805 in the entire application display unit 801. The selected region setting unit 805 includes a plurality of methods for selecting a region of image data. In the present embodiment, methods for selecting a region by the user with an external device are represented by three types of icons. In the example illustrated in the figure, the selected region setting unit 805 displays that the selection is valid by the method emphasized by the thick line of the middle icon. In this method, a portion including pixels that are adjacent to each other and that have the same color is selected in a part of the region of the image displayed in the image display unit 802. The portion selected in the image display unit 802 by the selected region setting unit 805 is displayed in such a manner that the outer peripheral region of the portion is emphasized. Specifically, the portion is enclosed by a thick dotted line in the display. In the figure, the lower left star-shaped region is selected. The method for selecting a region is not limited to this as long as a region to which metallic luster is to be added or a region whose metallic color is to be changed can be properly selected. Any method can be used as long as the method has a function similar to that of a region selection method used in a typical image editing application or the like.

Referring back to FIG. 7, in step S708, color designation of the region selected by the user is received.

Figure 12:
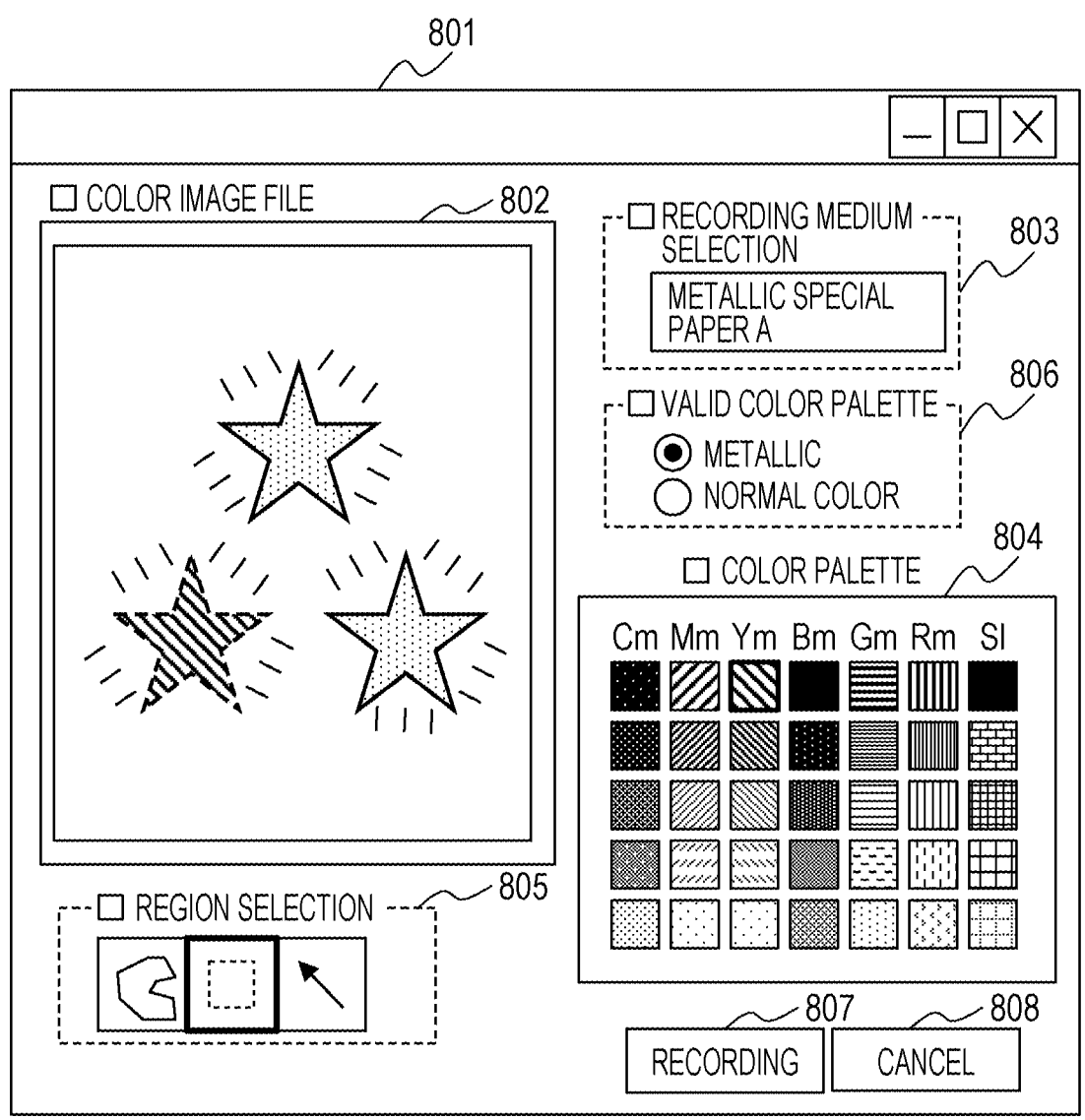
FIG. 12 is a diagram illustrating an application screen.

FIG. 12 is a view illustrating an example in which, for the image region of the image display unit 802 selected in step S707, a desired metallic color is selected from the defined colors of the color palette unit 804. In this example, a metallic color that develops a yellow metallic color is selected for the selected region. Specifically, in the color palette unit 804, the uppermost item of the column showing yellow metallic Ym hues, that is, a yellow metallic color having the highest concentration of yellow is selected. The selected item is displayed in an emphasized manner so that the user can recognize that the item has been selected. In this example, the selected item is emphasized by the thick line, and the color palette unit 804 displays that the selected item is valid. In addition, since the yellow metallic color is selected in the selected image region of the image display unit 802, the display is switched so that the user can recognize that the selected image region has metallic luster of a color different from a color of other metallic portions (the other two star-shaped regions in the figure).

FIG. 13 is a view illustrating a state of image data when, for the image region selected in step S707, the yellow metallic color having the highest concentration of yellow is selected in the color palette unit 804. With respect to the original image data illustrated in FIG. 4, each of the color image data and the metallic image data is changed. Specifically, in the color image data, the color of the lower left star-shaped image is set to a deep yellow. Furthermore, in the metallic image data, a star-shaped gray image that corresponds to the star-shaped image set to the color image data and that has the same size and the same shape as those of the star-shaped image is added in the lower left blank region.

Figure 18A:
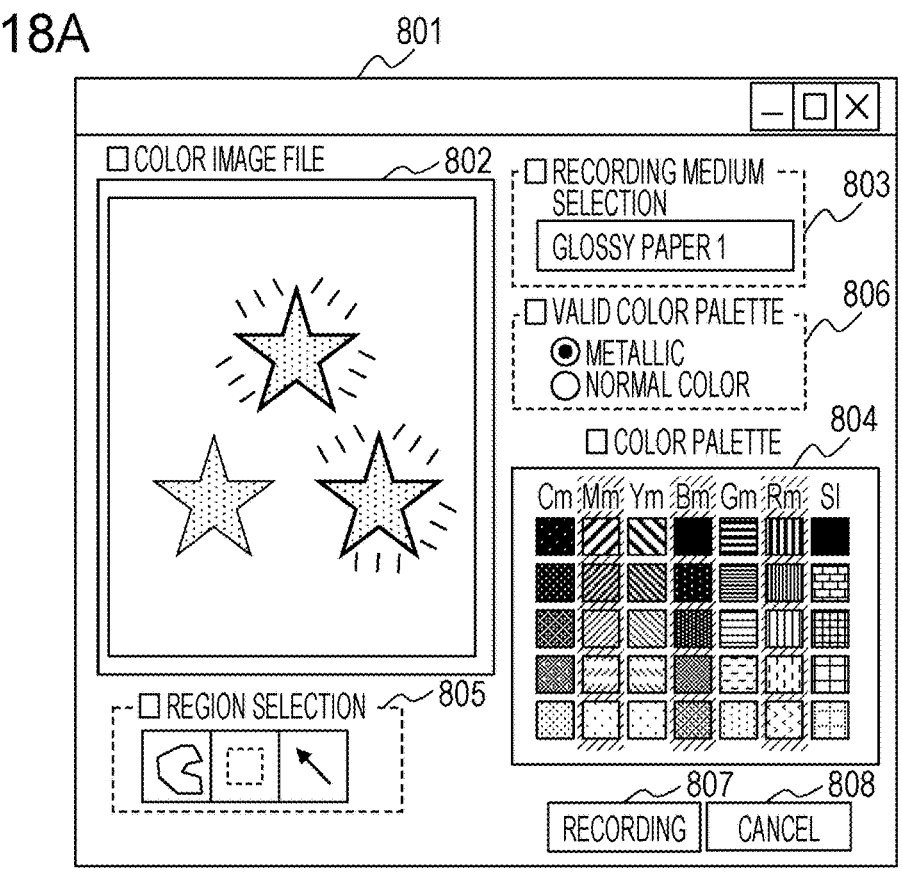
FIGS. 18A and 18B are diagrams illustrating an application screen.

Next, a case where "glossy paper 1" or "glossy paper 2" is selected as the recording medium will be described with reference to FIGS. 18A and 18B. In response to selection of "glossy paper 1" in step S703 in FIG. 7, a color palette associated with "glossy paper 1" is read out, and an instruction for setting is output to the color palette unit 804. As illustrated in FIG. 18A, the number of metallic colors that can be set for "glossy paper 1" is smaller than the number of metallic colors that can be set for "metallic special paper A". This is because, as described above, there are some cases where the coloring effect in a color metallic image is not achieved depending on the type of recording medium, and a metallic tint does not develop. "Glossy paper 1" selected here is a recording medium in which a magenta color material is unlikely to remain on a silver layer formed on a surface of the recording medium and a coloring effect is unlikely to be achieved. On glossy paper 1, hues that achieve color metallic portions are those in which a magenta ink is not used. Accordingly, four hues of cyan (C), yellow (Y), green (G), and silver (S1) are displayed on the color palette, and all the hues in which a magenta ink is used are restricted so as not to be selected. In the figure, the display of items of colors in which a magenta ink is used is invalidated (denoted by hatching in the figure). Alternatively, the color palette unit 804 may be configured not to display the items of colors in which a magenta ink is used. Similarly, a case where "glossy paper 2" is selected as the recording medium will be described with reference to FIG. 18B. "Glossy paper 2" is a recording medium in which a yellow color material is unlikely to remain on a silver layer formed on a surface of the recording medium and a coloring effect is unlikely to be achieved. On glossy paper 2, hues that achieve color metallic portions are those in which a yellow ink is not used. Accordingly, four hues of cyan (C), magenta (M), blue (B), and silver (Sl) are displayed on the color palette, and the hues in which a yellow ink is used are restricted so as not to be selected. In the figure, the display of the items of these hues is invalidated (denoted by hatching in the figure). The process of selecting a metallic color is the same as that in the example described above, and thus a description thereof is omitted.

In the recording medium selection display unit 803 of the present embodiment, only recording media on which a metallic image can be recorded can be selected. In other words, recording media on which a metallic image cannot be recorded even by application of a silver ink cannot be selected here. As described above, whether or not a color material easily remains on a silver layer, that is, the degree of development of the coloring effect as a color metallic portion varies depending on the combination of the type of the color material contained in a color ink and the type of the recording medium. In the present embodiment, dyes are used as color materials of color inks. Among the color inks of the present embodiment, a dye of cyan can exhibit a high coloring effect in any of the recording media that can be selected in the recording medium selection display unit 803 in the case of forming a color metallic portion. Specifically, in the case where the coloring effect is determined by the method described above, the color difference between a metallic color formed by using a metallic ink alone and a color metallic color formed by applying the metallic ink and a cyan ink one over the other is larger than a predetermined value. Accordingly, in the case where any of the recording media is selected, two hues of cyan (C) and silver (Sl) are displayed in the color palette unit 804 when a metallic color is selected.

Referring back to FIG. 7, in step S709, a determination whether the metallic color designation process is completed or not is received. In the case where the metallic color designation process is not completed, the process returns to step S707, and the processes from step S707 to step S708 are repeated. In the case where the metallic color designation process is completed, the process proceeds to step S710, the image is saved, and the process proceeds to step S711. In step S711, a determination whether all the processes are completed or not is received. In the case where another process is not carried out, the process is completed. In the case where another process is carried out, the process returns to step S705, and selection of the other process is received.

Figures 14A, 14B:
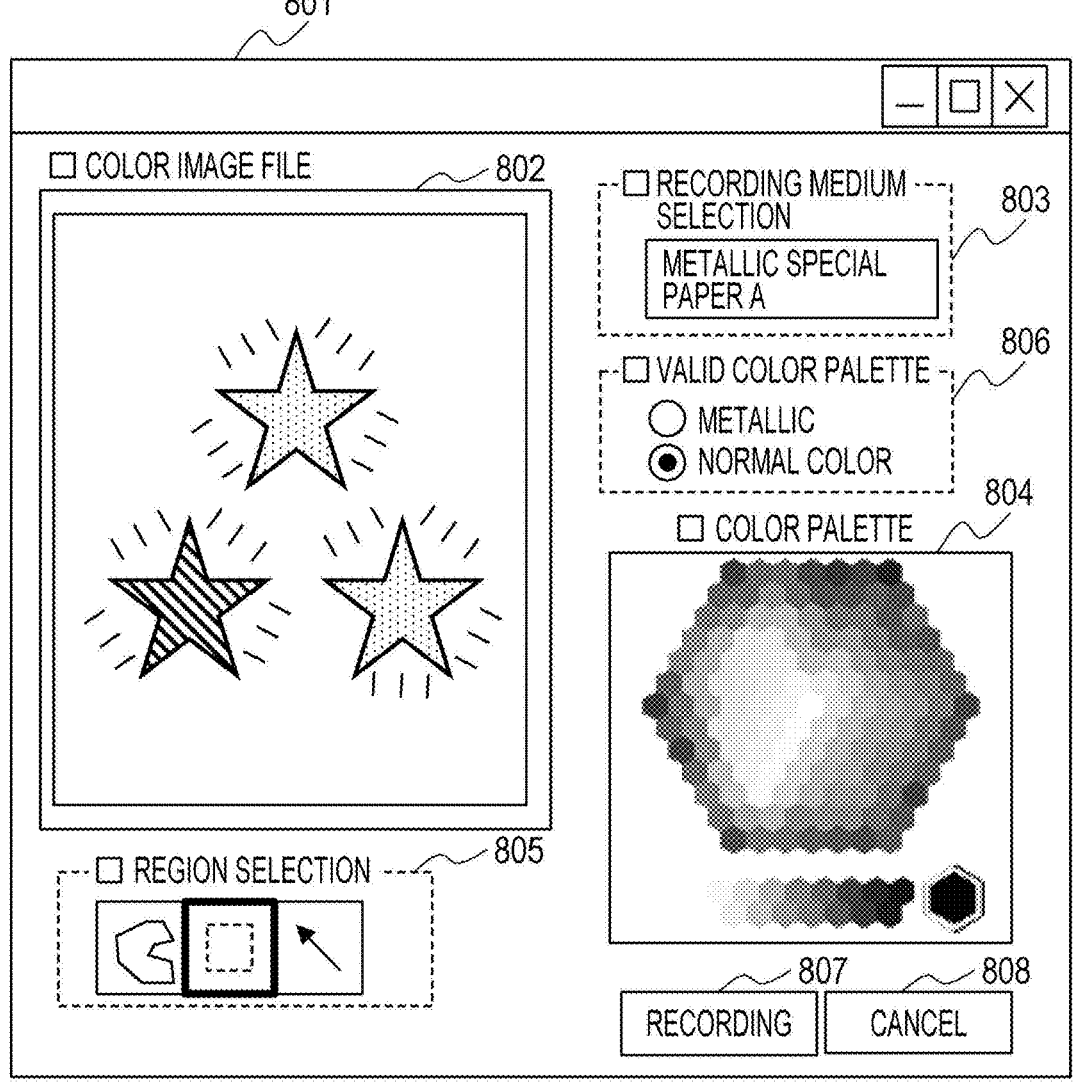
FIGS. 14A and 14B are diagrams illustrating an application screen.

FIGS. 14A and 14B are views each illustrating a case where execution of "color designation of normal color" is selected as another process in step S711. This process of "color designation of normal color" is a process in which not the color of a color metallic image recorded by using a color ink and a silver ink but the color of a color image formed by using a color ink alone is changed or selected. In step S720, "normal color" is selected in radio button selection of the valid color palette display unit 806. FIG. 14A illustrates an example of the color palette unit 804 and the valid color palette display unit 806 indicating a currently valid color palette in the entire application display unit 801. In the valid color palette display unit 806, "normal color" is selected by the radio button, and the display of "normal color" is valid. The color palette unit 804 is configured so that the user selects a desired color from the screen on which different colors are arranged in a honeycomb shape. Specifically, colors in a standard color space can be designated by using a standard user interface (UI) of the operating system (OS). The color palette is not limited to this. Alternatively, it is also possible to use, as the standard UI of the OS, an UI configured so that a color is designated from a screen on which colors are arranged in a gradation or an UI configured so that a color is designated from a screen on which a plurality of colors are arranged in a tile-like manner. FIG. 14B is a view illustrating a color palette configured so that a color is selected from a screen on which colors are arranged in a gradation.

Referring back to FIG. 7, in step S721, selection of a region whose normal color is to be changed on image data is received from the user.

Figure 15:
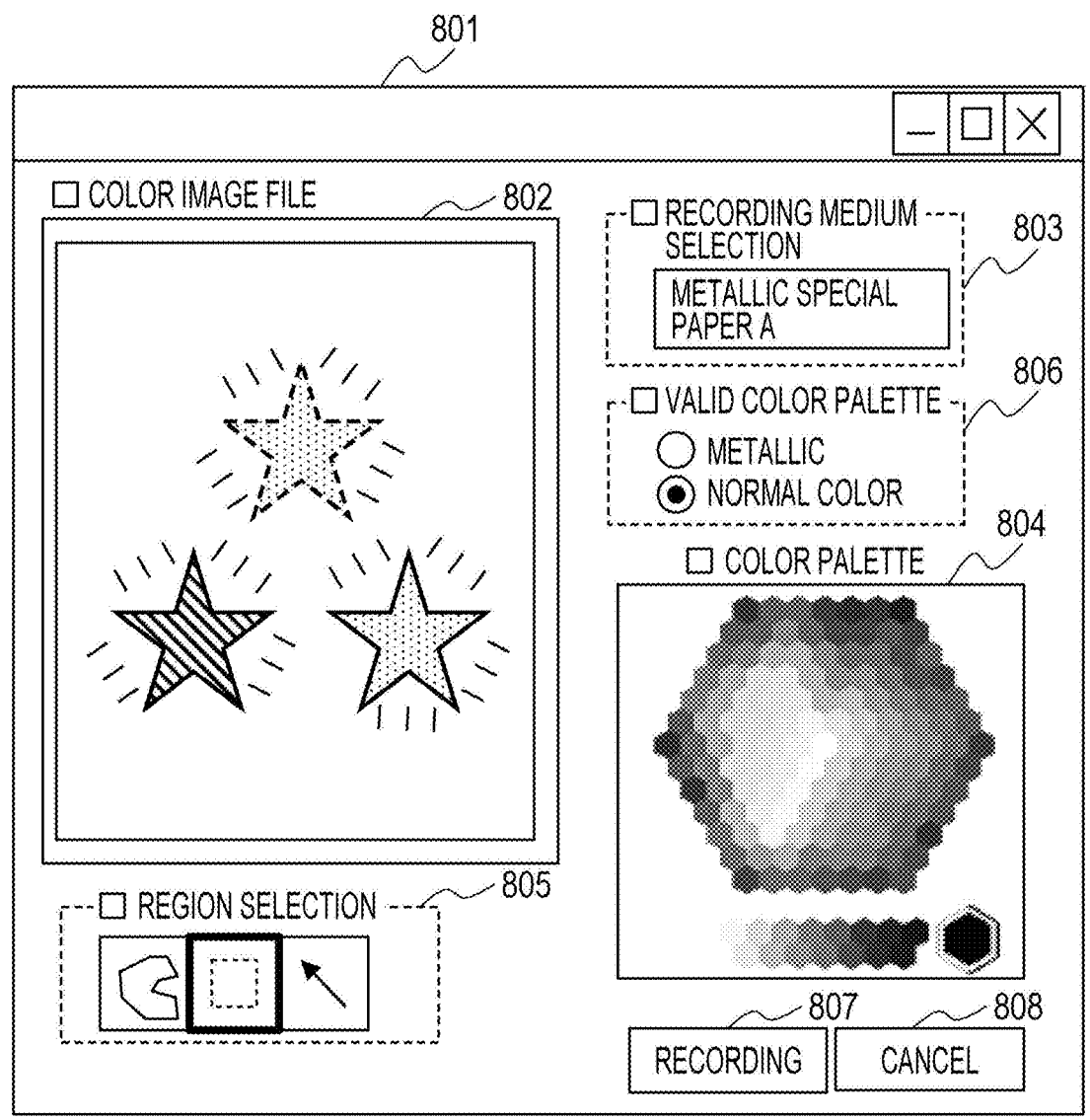
FIG. 15 is a diagram illustrating an application screen.

FIG. 15 illustrates an example of a display of the selected region setting unit 805 of the entire application display unit 801. FIG. 15 illustrates a state in which, as in the above-described case of selection of a metallic color, a portion including pixels that are adjacent to each other and that have the same color is selected in a part of the region of the image displayed in the image display unit 802. Specifically, the portion is enclosed by the thick dotted line in the display. In the figure, the upper star-shaped region is selected. The method for selecting a region may be another method as long as the region whose color is to be changed by the user can be properly selected as in the selection method in the case of a metallic color.

Referring back to FIG. 7, in step S722, color designation for the selected region is received from the user.

Figure 16:
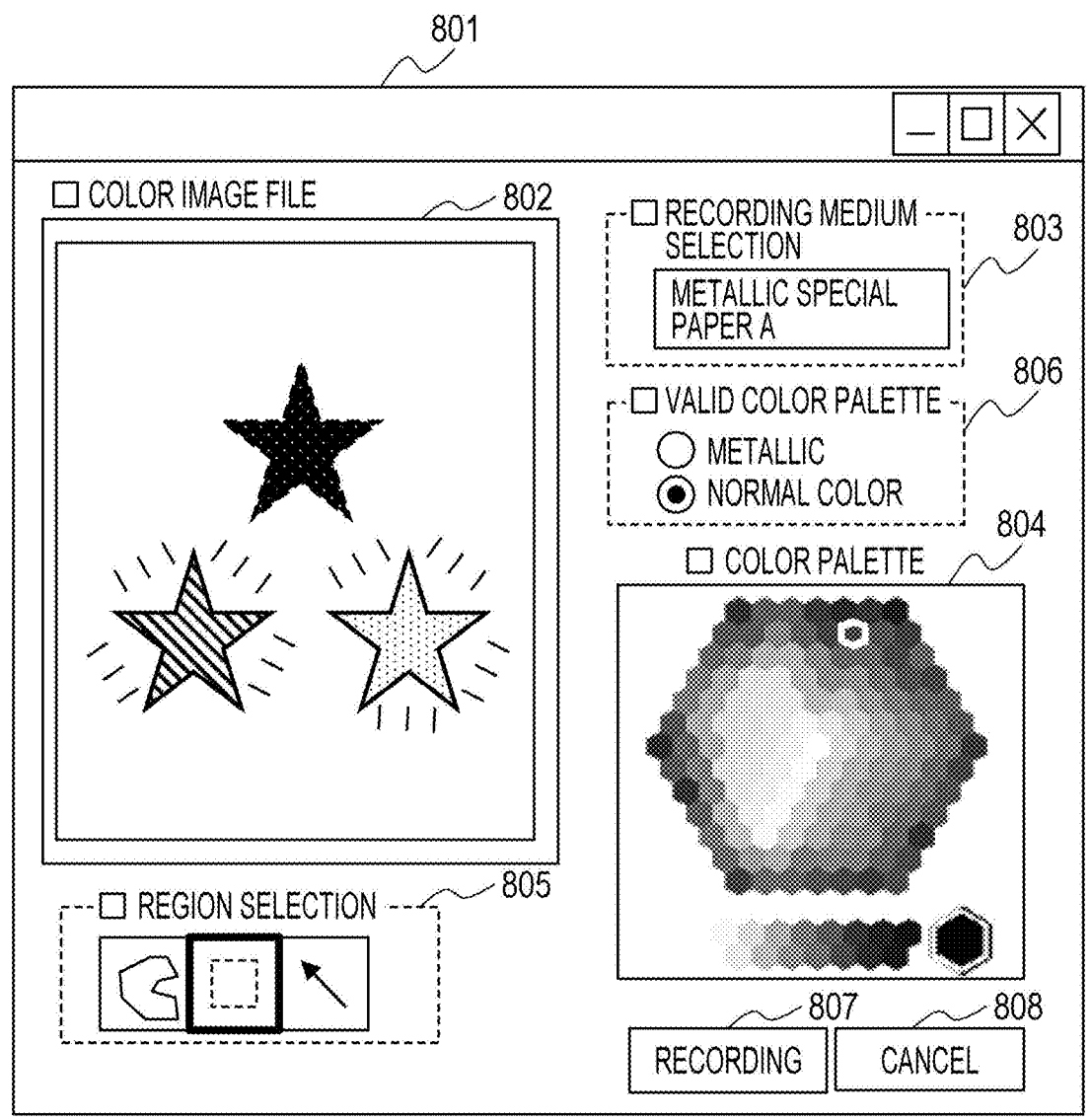
FIG. 16 is a diagram illustrating an application screen.

FIG. 16 illustrates an example in which, for the image region of the image display unit 802 selected in step S721, selection of a desired color from defined colors of the color palette unit 804 is received from the user. Here, a color that exhibits blue is selected for the selected region. Specifically, an item of blue (R, G, B=0, 0, 255) of the color palette unit 804 is selected. In the figure, the item of blue (R, G, B=0, 0, 255) is located at the position surrounded by the thick white line. Furthermore, since blue is designated as the normal color for the selected image region of the image display unit 802, the display of the selected image region is changed from one in which the selected image region can be recognized as a metallic region to one in which the selected image region can be recognized as a normal color region.

Referring back to FIG. 7, in step S723, a determination whether the color change process is completed or not is received. In the case where the color change process is not completed, the process returns to step S721, and the processes from step S721 to step S722 are repeated. In the case where the color change process is completed, the process proceeds to step S724, the image is saved, and the process proceeds to step S711.

Figure 17:
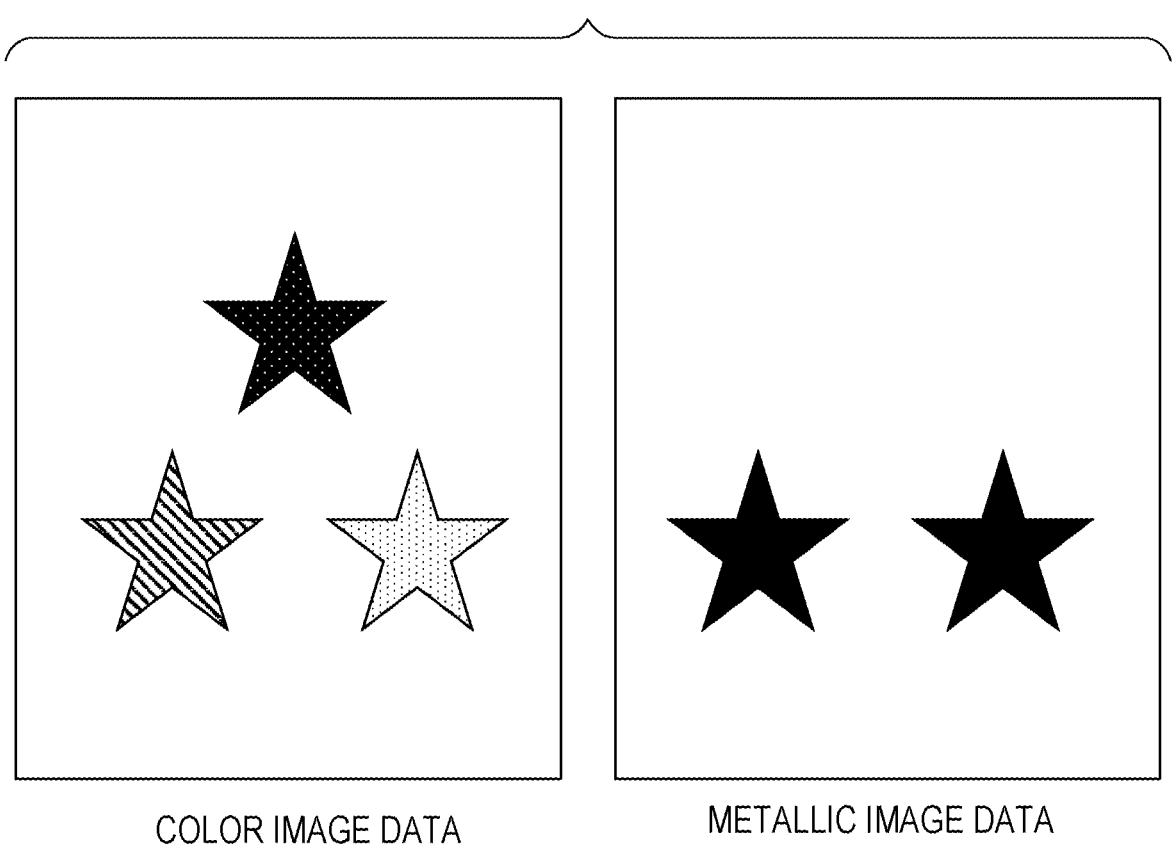
FIG. 17 includes diagrams illustrating image data subjected to image editing.

FIG. 17 includes views illustrating image data when blue (R, G, B=0, 0, 255) is selected in the color palette unit 804 for the image region selected in step S721. With respect to the image data illustrated in FIG. 13, each of the color image data and the metallic image data is changed. Specifically, the color of the upper star-shaped image is set to blue in the color image data, and the upper star-shaped image is deleted and changed to an image showing paper white in the metallic image data.

Next, in step S730, in response to depression of the recording button 807 of the entire application display unit 801, image recording on the recording medium is executed. Next, in step S731, upon receiving the instruction of recording execution, the CPU 130 of the personal computer 120 outputs, to the image processing device main controller 108, image data in which both the metallic color and the normal color are designated as desired colors of the user by the image editing described above. In step S732, the image processing device main controller 108 generates recording data in accordance with the data generation flow described with reference to FIG. 6. Subsequently, in step S733, the CPU 130 of the personal computer 120 outputs, to the ink jet recording device 10, recording data in which the generated recording data and command data for instructing execution of a specific operation are combined. Consequently, recording processing in the personal computer 120 is completed. In step S734, the ink jet recording device 10 receives the recording data and the command data. Upon receiving the data, the ink jet recording device 10 repeats scanning of the carriage on which the recording head is mounted and a conveying operation of the recording medium on the basis of the received data and ejects inks from the recording head to thereby record an image.

As described above, in the ink jet recording system of the present embodiment, metallic colors that can be reproduced on a selected recording medium can be selected on the basis of the combination of the type of recording medium and the type of color ink. With this configuration, in the case where a desired color metallic image is not formed on recorded matter, it is possible for the user to reduce the workload for editing the image data again and performing recording again. In addition, the amounts of inks and recording medium necessary for recording an image can also be reduced.

In the present embodiment, a description has been made of a flow in which a metallic color is designated when an image is edited on the application. Alternatively, the designation of a metallic color may be carried out in another step. For example, a method may be employed in which, after recording execution is selected on the application, selection of the recording medium and display of the color palette are carried out, a metallic color is then designated, and an image is recorded. In this case, it is also possible to appropriately change, with respect to the original image data, whether or not image data in a region where a metallic color has been designated is saved as a metallic image.

The present embodiment uses a configuration in which a color palette of metallic colors and a color palette of normal colors are associated with each other for each type of recording medium used, and the display of a color palette used is switched on the screen. However, the configuration is not limited thereto. Alternatively, for example, a color palette of metallic colors and a color palette of normal colors may be prepared as separate information for each type of recording medium, and a suitable color palette may be selected.

Figure 18B:
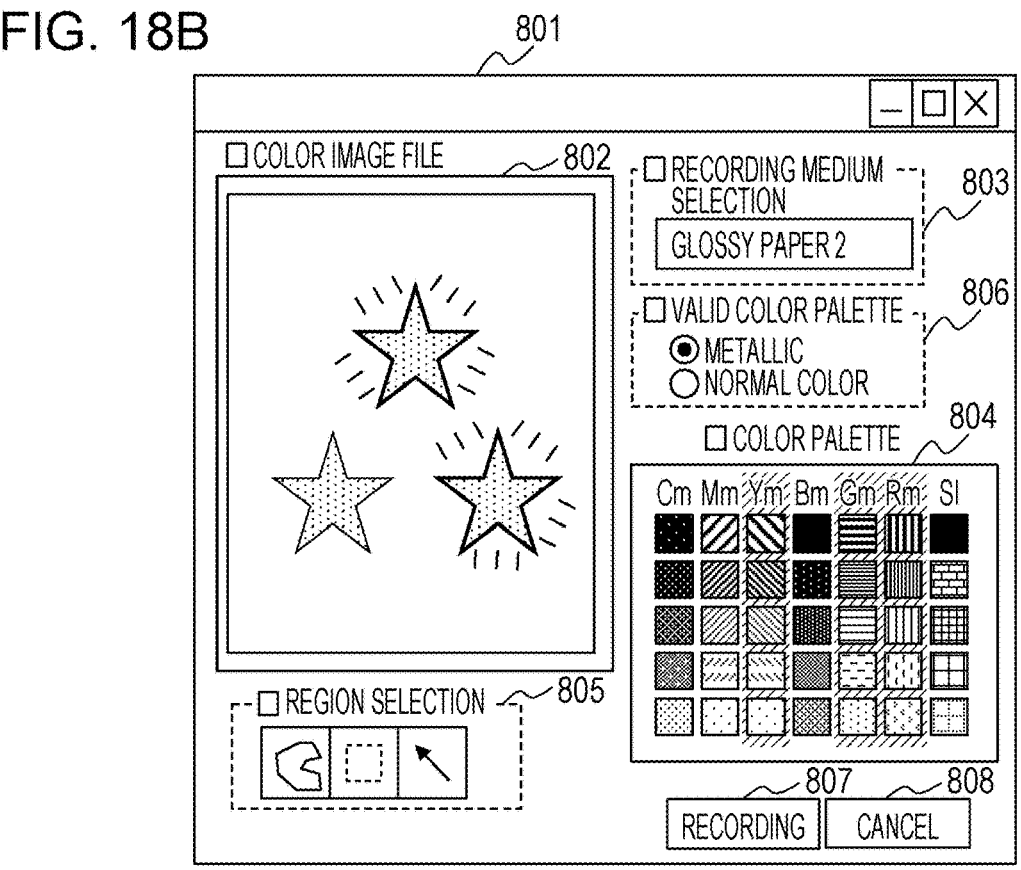
Figure 19:
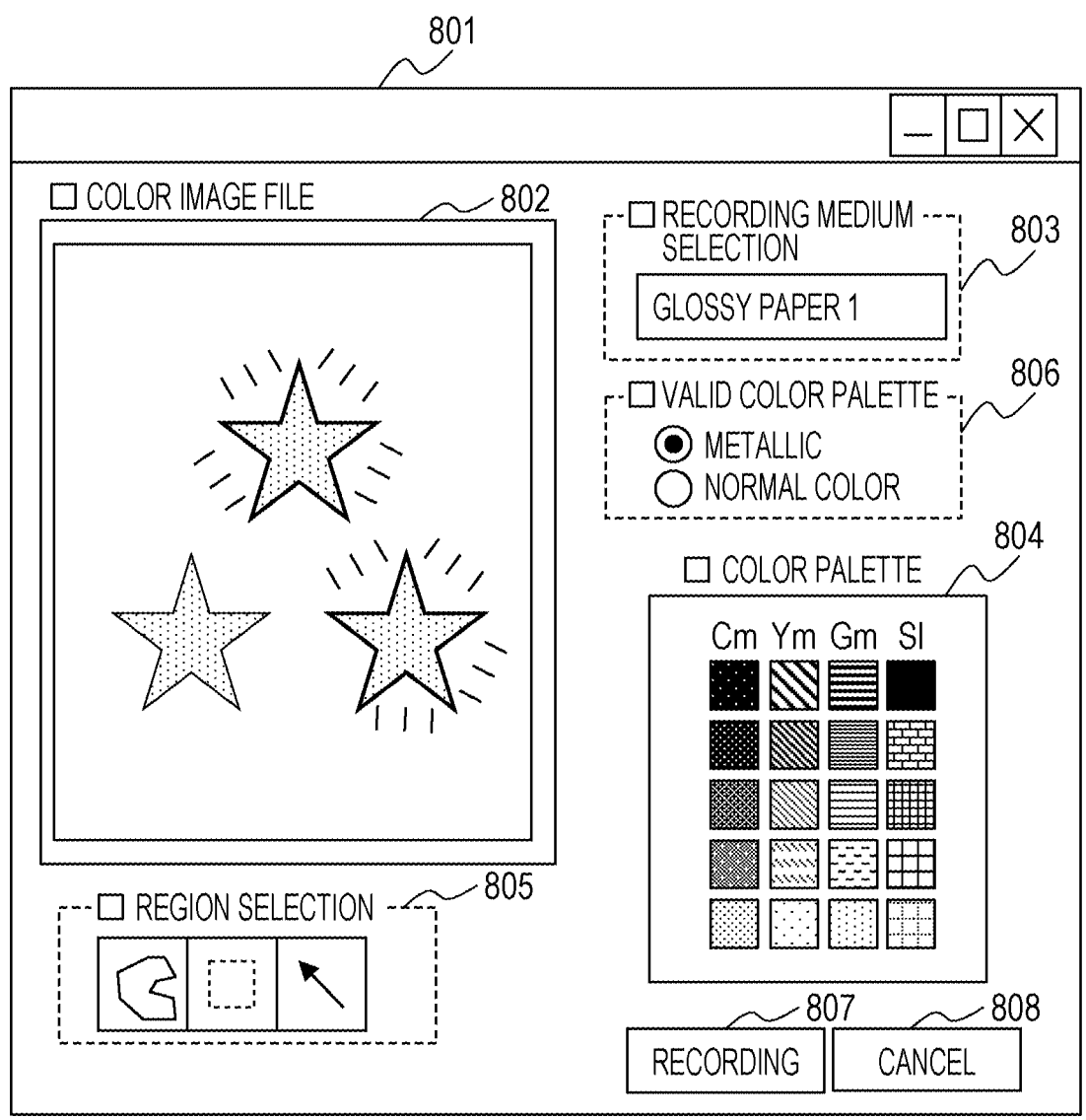
FIG. 19 is a diagram illustrating an application screen.

In the color palette associated with "glossy paper 1" illustrated by using FIGS. 18A and 18B, the display is restricted so that items for hues whose metallic colors are not developed cannot be selected. However, another method may be used. For example, FIG. 19 illustrates an example of a display of the entire application display unit 801 when "glossy paper 1" is selected, in which items for hues whose metallic colors are not developed are not displayed. In this case, the user easily confirms usable metallic colors when editing image data.

The metallic color selection display function may be a form of a plug-in program that is added to a general-purpose image editing application program and extends the function of the image editing application. The application program for realizing the function has functions as an image display unit, a color palette unit, an image region selection display unit, and an output unit. Through a GUI provided by the application program, a user can instruct recording of an image and designate a region where metallic luster is formed. In order to use a prepared color palette, it is necessary to cause the application to read the plug-in in advance. In the case where image editing is carried out in such a general-purpose application, upon start-up of the application, the application prompts a user to select a color palette suitable for a medium to be used.

In the present embodiment, a description has been made of an example in which, as illustrated in FIG. 4, image data that includes both color image data and metallic image data is acquired. However, the embodiment is not limited thereto. In another embodiment, image data that includes only color image data may be acquired, and metallic image data may be newly generated by receiving an instruction to apply metallic luster in the application 150.

In the present embodiment, a description has been made using, as an example, a color ink that contains a dye as a color material. However, the color material is not limited to a dye. For example, a color material other than a dye, such as a pigment, is also applicable as long as the color material has a small particle size and falls in a silver layer.

In the description of the present embodiment, the silver layer formed of a metallic ink alone has achromatic silver luster, and the hue of silver (S1) displayed on the color palette is recorded by the metallic ink alone without using a color ink. Therefore, the hue of silver is displayed on any recording medium regardless of the type of recording medium. However, the configuration is not limited thereto. For example, in the case where a metallic ink has a tint, toning may be performed by using a color ink. In such a case, the display of the hue of silver may be omitted in consideration that the coloring effect of the color ink used in toning is not exhibited in some types of recording media. The recording medium selection display unit 803 is configured so that only recording media on which a metallic image can be recorded can be selected. Alternatively, the recording medium selection display unit 803 may be configured so that a recording medium, such as plain paper, which does not exhibit metallic luster even when a silver ink is applied thereto, can be selected. In such a case, preferably, a color palette for selecting metallic colors is not displayed or all the hues that express color metallic portions cannot be selected.

According to the present disclosure, in processing image data for recording a metallic color image by using a metallic ink and a color ink, it is possible to receive an input of information relating to a metallic color that can be reproduced depending on the type of recording medium, and the workload of a user can be reduced.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-224160 filed Nov. 29, 2018, which is hereby incorporated by reference herein in its entirety.

What is claimed is:

1. An information processing device relating to a recording device that records an image on a recording medium,
wherein the recording device is capable of forming a color metallic portion by applying a metallic ink containing metal particles and a color ink containing a color material to a recording medium one over the other, wherein a first color difference between a color of a first metallic portion where only a metallic ink is applied to a first recording medium and a color of a first color metallic portion where the metallic ink and a first color ink are applied to the first recording medium one over the other is equal to or smaller than a predetermined threshold value, and wherein a second color difference between a color of a second metallic portion where only the metallic ink is applied to a second recording medium and a color of a second color metallic portion where the metallic ink and the first color ink are applied to the second recording medium one over the other is larger than the predetermined threshold value, the information processing device comprising:

an acquisition unit configured to acquire medium information relating to a type of recording medium on which the image is to be recorded; and an output unit configured to output, on the basis of the acquired medium information, an instruction to cause a display unit to display a plurality of items corresponding to a plurality of colors for setting a color of a color metallic portion to be formed on the image, wherein an instruction that is output in a case where the medium information indicates the first recording medium includes an instruction not to display an item corresponding to a first color recorded by using the first color ink, and an instruction that is output in a case where the medium information indicates the second recording medium includes an instruction to display the item corresponding to the first color.

2. The information processing device according to claim 1, wherein the instruction that is output in the case where the medium information indicates the first recording medium includes an instruction not to display all items corresponding to colors recorded by using the first color ink.

3. The information processing device according to claim 1, wherein a third color difference between the color of the first metallic portion and a color of a third color metallic portion where the metallic ink and a second color ink are applied to the first recording medium one over the other is larger than the predetermined threshold value, wherein a fourth color difference between the color of the second metallic portion and a color of a fourth color metallic portion where the metallic ink and the second color ink are applied to the second recording medium one over the other is larger than the predetermined threshold value, and wherein an instruction that is output by the output unit in the case where the medium information indicates the first recording medium and an instruction that is output by the output unit in the case where the medium information indicates the second recording medium each include an instruction to display an item corresponding to a second color recorded by using the second color ink without using the first color ink.

4. The information processing device according to claim 1, wherein the instruction that is output in the case where the medium information indicates the second recording medium includes an instruction to display items corresponding to all colors that the display unit is capable of displaying.

5. The information processing device according to claim 1, wherein the second recording medium is special paper for recording with the metallic ink.

6. The information processing device according to claim 1, wherein the second recording medium contains an aggregating agent having an effect of aggregating the color material contained in the first color ink, and the first recording medium contains no aggregating agent having an effect of aggregating the color material contained in the first color ink.

7. The information processing device according to claim 1, wherein regardless of the type of recording medium indicated by the medium information, the instruction that is output by the output unit includes an instruction to display an item corresponding to a metallic color recorded by using the metallic ink alone.

8. The information processing device according to claim 1, wherein when the color of the first metallic portion, the color of the second metallic portion, the color of the first color metallic portion, and the color of the second color metallic portion are each a color defined by a CIELab color space, the predetermined threshold value is 3.

9. The information processing device according to claim 1, wherein the metallic ink is applied to each of the first metallic portion and the second metallic portion at a first recording duty, the metallic ink is applied to each of the first color metallic portion and the second color metallic portion at the first recording duty per unit region, and the first color ink is applied to each of the first color metallic portion and the second color metallic portion at a second recording duty per unit region.

10. The information processing device according to claim 9, wherein the first recording duty is a recording density in which one droplet of the metallic ink having a weight of 4 ng is applied to each pixel at 1200 dpi×1200 dpi.

11. The information processing device according to claim 9, wherein the second recording duty is a recording density in which one droplet of the first color ink is applied to each pixel at 1200 dpi×1200 dpi.

12. The information processing device according to claim 1, further comprising:

a display control unit configured to display a preview image on the display unit on the basis of the instruction output by the output unit.

13. The information processing device according to claim 12, further comprising:

a receiving unit configured to receive an input of information relating to an item displayed on the display unit; and a generating unit configured to generate image data corresponding to the displayed preview image on the basis of the information received by the receiving unit.

14. The information processing device according to claim 1, wherein the instruction not to display an item corresponding to the first color recorded by using the first color ink, the instruction being included in the instruction that is output in the case where the medium information indicates the first recording medium, includes an instruction to display the item in an invalidated form.

15. The information processing device according to claim 1, wherein the first color metallic portion and the second color metallic portion are formed by applying the metallic ink and subsequently applying the first color ink.

16. The information processing device according to claim 1, wherein the metallic ink contains silver particles as the metal particles.

17. The information processing device according to claim 16, wherein the silver particles have an average particle size of 1 nm or more and 200 nm or less.

18. The information processing device according to claim 16, wherein a content of the silver particles in the metallic ink is 2.0% by mass or more and 15.0% by mass or less based on a total mass of the ink.

19. The information processing device according to claim 1, wherein the first color ink contains a dye as the color material.

20. The information processing device according to claim 1, wherein the first color ink is a magenta ink.

21. The information processing device according to claim 3, wherein the second color ink is a cyan ink.

22. An information processing method relating to a recording device that records an image on a recording medium,
wherein the recording device is capable of forming a color metallic portion by applying a metallic ink containing metal particles and a color ink containing a color material to a recording medium one over the other,
wherein a first color difference between a color of a first metallic portion where only a metallic ink is applied to a first recording medium and a color of a first color metallic portion where the metallic ink and a first color ink are applied to the first recording medium one over the other is equal to or smaller than a predetermined threshold value, and
wherein a second color difference between a color of a second metallic portion where only the metallic ink is applied to a second recording medium and a color of a second color metallic portion where the metallic ink and the first color ink are applied to the second recording medium one over the other is larger than the predetermined threshold value,
the information processing method comprising:
an acquisition step of acquiring medium information relating to a type of recording medium on which the image is to be recorded; and
an output step of outputting, on the basis of the acquired medium information, an instruction to cause a display unit to display a plurality of items corresponding to a plurality of colors for setting a color of a color metallic portion to be formed on the image,
wherein an instruction that is output in a case where the medium information indicates the first recording medium includes an instruction not to display an item corresponding to a first color recorded by using the first color ink, and an instruction that is output in a case where the medium information indicates the second recording medium includes an instruction to display the item corresponding to the first color.

23. A non-transitory storage medium storing a program for causing a computer to execute steps of an information processing method relating to a recording device that records an image on a recording medium, wherein the recording device is capable of forming a color metallic portion by applying a metallic ink containing metal particles and a color ink containing a color material to a recording medium one over the other, wherein a first color difference between a color of a first metallic portion where only a metallic ink is applied to a first recording medium and a color of a first color metallic portion where the metallic ink and a first color ink are applied to the first recording medium one over the other is equal to or smaller than a predetermined threshold value, and wherein a second color difference between a color of a second metallic portion where only the metallic ink is applied to a second recording medium and a color of a second color metallic portion where the metallic ink and the first color ink are applied to the second recording medium one over the other is larger than the predetermined threshold value, the information processing method comprising the steps of: acquiring medium information relating to a type of recording medium on which the image is to be recorded; and outputting, on the basis of the acquired medium information, an instruction to cause a display unit to display a plurality of items corresponding to a plurality of colors for setting a color of a color metallic portion to be formed on the image, wherein an instruction that is output in a case where the medium information indicates the first recording medium includes an instruction not to display an item corresponding to a first color recorded by using the first color ink, and an instruction that is output in a case where the medium information indicates the second recording medium includes an instruction to display the item corresponding to the first color.

24. The non-transitory storage medium according to claim 23, wherein the program is a plug-in program configured to extend a function of an image-editing application for editing image data.

* * * * *